US011347253B2

(12) United States Patent
Park et al.

(10) Patent No.: US 11,347,253 B2
(45) Date of Patent: May 31, 2022

(54) ELECTRONIC DEVICE TO PERFORM POWER MANAGEMENT AND OPERATING METHOD THEREOF

(71) Applicant: SAMSUNG ELECTRONICS CO., LTD., Suwon-si (KR)

(72) Inventors: Jaeseok Park, Suwon-si (KR); Sungku Yeo, Suwon-si (KR); Youngho Ryu, Suwon-si (KR); Jaesun Shin, Suwon-si (KR); Jeongman Lee, Suwon-si (KR); Chongmin Lee, Suwon-si (KR); Hyoseok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/022,540

(22) Filed: Sep. 16, 2020

(65) Prior Publication Data

US 2021/0149428 A1 May 20, 2021

(30) Foreign Application Priority Data

Nov. 18, 2019 (KR) ........................ 10-2019-0147646

(51) Int. Cl.
*H02J 3/14* (2006.01)
*G05F 1/625* (2006.01)

(52) U.S. Cl.
CPC .................................... *G05F 1/625* (2013.01)

(58) Field of Classification Search
CPC ........................................................ G05F 1/625
(Continued)

(56) References Cited

U.S. PATENT DOCUMENTS 4,475,160 A 10/1984 Inaba
5,999,417 A * 12/1999 Schlecht .............. H02M 3/335 363/16
(Continued)

FOREIGN PATENT DOCUMENTS

JP 10-084688 3/1998
JP 2006-082202 3/2006
(Continued)

OTHER PUBLICATIONS

Search Report and Written Opinion dated Dec. 3, 2020 in counterpart International Patent Application No. PCT/KR2020/012054.

*Primary Examiner* — Ryan Jager
(74) *Attorney, Agent, or Firm* — Nixon & Vanderhye P.C.

(57) ABSTRACT

An electronic device according to an embodiment may include: a plurality of loads, a processor, and a power management circuit configured to provide the plurality of loads with a power, wherein the power management circuit may include a plurality of regulators configured to adjust a voltage of a power received from a power source and output a voltage-adjusted power, a switching circuit configured to connect at least one of the plurality of regulators to at least one of the plurality of loads, a plurality of power sensors each power sensor being configured to measure a magnitude of a power input to each of the plurality of loads, and a controller. The controller may be configured to obtain information related to an operation of each of the plurality of loads from the processor, obtain the magnitude of the power input to each of the plurality of loads from each of the plurality of power sensors, and identify a load which operates abnormally among the plurality of loads based on the magnitude of the power input to each of the plurality of loads and the information related to the operation of each of the plurality of loads.

18 Claims, 15 Drawing Sheets

(58) Field of Classification Search
USPC .............................................................. 307/31
See application file for complete search history.

(56) References Cited

U.S. PATENT DOCUMENTS

| | | | | |
|---|---|---|---|---|
| 6,112,156 | A * | 8/2000 | Kang .................... | G01R 31/343 702/58 |
| 7,145,786 | B2 * | 12/2006 | Vinciarelli ............ | H02M 3/337 363/17 |
| 7,202,646 | B2 * | 4/2007 | Vinciarelli .............. | H02M 1/36 323/266 |
| 10,700,599 | B2 * | 6/2020 | Vinciarelli .............. | H02M 3/00 |
| 10,850,619 | B2 * | 12/2020 | Takegawa ............. | B60L 15/007 |
| 10,916,947 | B2 * | 2/2021 | Shen ......................... | H02J 3/38 |
| 2003/0142513 | A1 * | 7/2003 | Vinciarelli .............. | H02M 1/08 363/17 |
| 2010/0001870 | A1 | 1/2010 | Hong et al. | |
| 2010/0281298 | A1 | 11/2010 | Pont et al. | |
| 2015/0057253 | A1 | 2/2015 | Fang et al. | |
| 2016/0043683 | A1 * | 2/2016 | Ogawa .................. | H02P 29/024 318/563 |
| 2017/0057095 | A1 | 3/2017 | Oestergaard et al. | |
| 2018/0213621 | A1 * | 7/2018 | Freer .................. | H05B 45/3725 |
| 2019/0339727 | A1 | 11/2019 | Ganesan et al. | |
| 2020/0251925 | A1 * | 8/2020 | Cheng ....................... | H02J 7/02 |
| 2020/0284690 | A1 * | 9/2020 | Kanemaru .......... | G01M 13/023 |
| 2021/0075360 | A1 * | 3/2021 | Yokoi .................... | H02H 7/085 |
| 2021/0149428 | A1 * | 5/2021 | Park ........................ | G05F 1/625 |
| 2021/0241681 | A1 * | 8/2021 | Takahashi ................ | G09G 3/32 |

FOREIGN PATENT DOCUMENTS

| | | | |
|---|---|---|---|
| JP | 2017-087366 | | 5/2017 |
| KR | 10-2015-0089722 | | 8/2015 |
| KR | 10-2019-0126711 | A | 11/2019 |
| KR | 10-2020-0132631 | A | 11/2020 |

* cited by examiner

ELECTRONIC DEVICE TO PERFORM POWER MANAGEMENT AND OPERATING METHOD THEREOF

CROSS-REFERENCE TO RELATED APPLICATION

This application is based on and claims priority under 35 U.S.C. § 119 to Korean Patent Application No. 10-2019-0147646, filed on Nov. 18, 2019, in the Korean Intellectual Property Office, the disclosure of which is incorporated by reference herein in its entirety.

BACKGROUND

Field

The disclosure relates to an electronic device to perform power management and an operating method thereof.

Description of Related Art

Various kinds of movable electronic devices (e.g., robots) are widely used. These electronic devices comprise wheels, legs, flying propellers, or other various moving means to move from one position to another position. Upon detecting an occurrence of a specific event, an electronic device may move to a point corresponding to the detected specific event. For example, upon receiving a message for transferring to a specific user, the electronic device may move near the specific user and provide the specific user with the message in a visual or audible manner. Upon recognizing a user's call, the electronic device may move near the user and output a voice.

The electronic device may perform various operations, e.g., such as an operation of obtaining ambient information, receiving communication signals via a communication network, analyzing data, outputting information, and moving to another point, and/or the like and the electronic device may include a plurality of loads for performing the various operations. The electronic device may include a regulator to provide each of the plurality of loads with regulated power.

While an electronic device operates, a processor (e.g., an AP) performs various functions, so there is a limit to performing a safety operation with only the processor (e.g., an AP) due to an unexpected abnormal situation. In particular, if a sudden processor malfunction occurs, it is impossible to control an operation of a load (e.g., a motor, a sensor, a display, a communication module, and/or the like) included in the electronic device. In a case that the electronic device is moving, if control of a motor operation by the processor is impossible, a serious accident may occur. For a robotic electronic device, stability is required to be secured according to an evaluation criterion of safety integrity level (SIL).

SUMMARY

Embodiments of the disclosure provide an electronic device and an operating method thereof that may identify whether a load operates abnormally based on a comparison between a power actually consumed by the load and an expected power to be consumed.

An electronic device according to an example embodiment may include: a plurality of loads, a processor, and a power management circuit configured to provide the plurality of loads with power, wherein the power management circuit may include a plurality of regulators configured to adjust a voltage of power received from a power source and output a voltage-adjusted power, a switching circuit configured to connect at least one of the plurality of regulators to at least one of the plurality of loads, a plurality of power sensors each power sensor being configured to measure a magnitude of a power input to each of the plurality of loads, and a controller. The controller may be configured to: obtain information related to an operation of each of the plurality of loads from the processor, obtain the magnitude of the power input to each of the plurality of loads from each of the plurality of power sensors, and identify a load which operates abnormally among the plurality of loads based on the magnitude of the power input to each of the plurality of loads and the information related to the operation of each of the plurality of loads.

According to an example embodiment, an operating method of an electronic device including a plurality of loads and a power management circuit configured to provide the plurality of loads with power may include: obtaining information related to an operation of each of the plurality of loads, obtaining a magnitude of a power input to each of the plurality of loads from a plurality of power sensors, and identifying a load which operates abnormally among the plurality of loads based on the magnitude of the power input to each of the plurality of loads and the information related to the operation of each of the plurality of loads.

According to an example embodiment, a power management circuit configured to provide a plurality of loads with a power may include: a plurality of regulators configured to adjust a voltage of power received from a power source and output voltage-adjusted power, a switching circuit configured to connect at least one of the plurality of regulators to at least one of the plurality of loads, a plurality of power sensors each power sensor being configured to measure a magnitude of a power input to each of the plurality of loads, and a controller. The controller may be configured to: obtain information related to an operation of each of the plurality of loads from an external electronic device, obtain the magnitude of the power input to each of the plurality of loads from each of the plurality of power sensors, and identify a load which operates abnormally among the plurality of loads based on whether the magnitude of the power input to each of the plurality of loads satisfies a condition corresponding to the information related to the operation of each of the plurality of loads.

An electronic device according to an example embodiment may include: a plurality of loads, a processor, and a power management circuit configured to provide the plurality of loads with power, and the power management circuit may include: a plurality of regulators configured to adjust a voltage of a power received from a power source and output a voltage-adjusted power, a switching circuit configured to connect at least one of the plurality of regulators to at least one of the plurality of loads, and a plurality of power sensors each power sensor being configured to measure a magnitude of a power input to each of the plurality of loads. The processor may be configured to: obtain information related to an operation of each of the plurality of loads, obtain the magnitude of the power input to each of the plurality of loads from each of the plurality of power sensors, and identify a load which operates abnormally among the plurality of loads based on whether the magnitude of the power input to each of the plurality of loads satisfies a condition corresponding to the information related to the operation of each of the plurality of loads.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
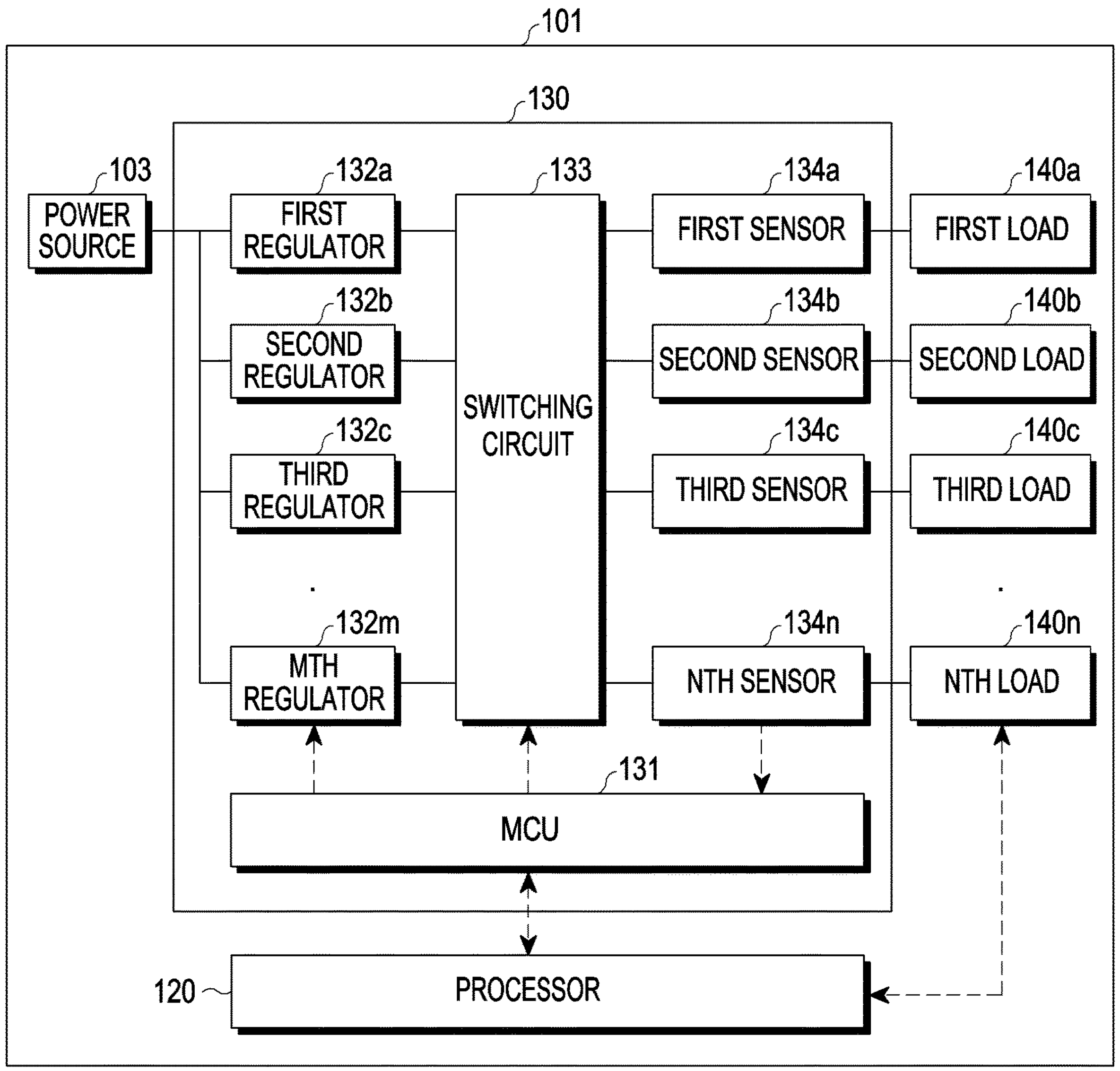
FIG. 1A is a block diagram illustrating an example electronic device according to an embodiment.

FIG. 1A is a block diagram illustrating an example electronic device according to an embodiment.

Referring to FIG. 1A, an electronic device 101 according to an embodiment may include at least one of a power source 103, a processor (e.g., including processing circuitry) 120, a power management circuit 130, and/or a plurality of (e.g., N) loads 140*a*, 140*b*, 140*c*, and 140*n*.

The power source 103 according to an embodiment may, for example, include a battery. The battery may be implemented with a rechargeable secondary battery. The battery may be charged with power received via an interface (not shown) and/or power received via a wireless charging module (not shown). Although not shown, according to an embodiment, the interface and/or the wireless charging module may be connected to a charger (or a converter) (not shown), and the battery may be charged with power adjusted by the charger. The charger and/or converter may be implemented as an independent element from the power management circuit 130 or as at least some of the power management circuit 130. The battery may transfer stored power to the power management circuit 130. According to an embodiment, the power source 103 may be implemented with an interface which is connected by wire to an external power source, and transfers power from the external power source to the power management circuit 130. The interface may, for example, be implemented with various universal serial bus (USB) types of connectors, and there is no limitation to a type of connector. If a direct current (DC) power is received from the external power source, the interface may transfer the received DC power to the power management circuit 130 or convert a magnitude of voltage of the DC power and transfer the converted DC power. If an alternating current (AC) power is received from the external power source, the interface may convert the AC power into a DC power and/or convert a magnitude of voltage of the AC power and transfer the converted AC power to the power management circuit 130. According to an embodiment, the power source 103 may be implemented with a wireless charging module according to a scheme defined, for example, and without limitation, in a wireless power consortium (WPC) standard (or a Qi standard), a scheme defined in an alliance for wireless power (A4WP) standard (or an air fuel alliance (AFA) standard), or the like. A power via the interface and/or a power via the wireless charging module may be transferred to the battery via the charger or the power management circuit 130.

According to an embodiment, the processor 120 may include various processing circuitry and execute, e.g., software to control at least one other component (e.g., a hardware or software component) of the electronic device 101 connected to the processor 120 and may perform various data processing and computing operations. For example, the processor 120 may control another component, e.g., a load (e.g., a plurality of loads 140*a*, 140, 140*c*, and 140*n* and/or a micro-controlling unit (MCU) 131), and may receive data from the load (e.g., the plurality of loads 140*a*, 140, 140*c*, and 140*n* and/or the MCU 131) and process the data. The processor 120 may load and process an instruction or data received from another load (e.g., an input device, a sensor module and/or a communication module) onto a volatile memory (e.g., a random access memory (RAM)), and the processor 120 may store resultant data in a non-volatile memory (e.g., a NAND). According to an embodiment, the processor 120 may include, for example, and without limitation, a main processor (e.g., a central processing unit (CPU) or an application processor), a dedicated processor, an auxiliary processor (e.g., a graphics processing unit (GPU), an image signal processor, a sensor hub processor, or a communication processor), or the like which is operated independently from the main processor, and additionally or alternatively, which consumes less power than the main processor or is specified for a designated function. The auxiliary processor may be operated separately from or embedded in the main processor. For example, a plurality of chips or circuits capable of performing computation may be included in the electronic device 101. The auxiliary processor may control at least some of functions or states related to at least one load (e.g., an output device, a sensor module, or a communication module) among components of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another load (e.g., a camera or a communication module) functionally related to the auxiliary processor. The memory (not shown) may store various data, e.g., software and input data or output data for an instruction related to the software, used by at least one component (e.g., the processor 120 or a sensor module) of the electronic device 101. The memory (not shown) may include a volatile memory and/or a non-volatile memory. The processor 120 may output computed information or control a driving circuit for moving to another point based on information obtained based on a load (e.g., a sensor module or communication circuit). According to an embodiment, at least some programs for an operation of the electronic device 101 may be stored in an external device (e.g., a server). In this case, the electronic device 101 may transmit a query to the external device, and the external device may generate a response using data contained in the query and transmit the response to the electronic device 101.

In the present disclosure, the electronic device 101 performing a specific operation may refer, for example, to various loads, e.g., the processor 120 and/or a control circuit such as a Micro Controller Unit (MCU) 131, or another load included in the electronic device 101 performing the specific operation. As the control circuit or the other load performs the specific operation, power may be consumed. The electronic device 101 performing the specific operation may also refer, for example, to the processor 120 and/or the MCU 131 controlling the other load to perform the specific operation. The electronic device 101 performing the specific operation may also refer, for example, to an instruction for performing a specific operation stored in a storage circuit (e.g., a memory) of the electronic device 101 being executed, the processor 120 and/or the MCU 131 or the other load being triggered to perform the specific operation or the instruction being stored in the storage circuit.

According to an embodiment, the processor 120 may control at least some of the plurality of loads 140*a*, 140*b*, 140*c*, and 140*n*. In FIG. 1A, for simplicity, the processor 120 is illustrated as controlling an Nth load 140*n*, but the processor 120 may control each of the plurality of loads 140*a*, 140*b*, 140*c*, and 140*n*. A dotted line in FIG. 1A may refer, for example, to transmission and reception of data such as a control signal or a sensing signal. The processor 120 may also transmit and receive data to and from the MCU 131.

For example, the processor 120 may provide the MCU 131 with information related to an operation of a load. The information related to the operation of the load may include state information indicating a state of at least one load or control information indicating control for the at least one load. The state information may include, for example, information indicating a state of a specific load, and may include, for example, one of a turned-off state, an idle state, a sleep state, an activated state, or the like, however, there is no limitation to an example of the state information. The control information may include, for example, information about control for a specific load in an arbitrary state (e.g., an activated state) of the specific load. For example, in a case of a motor, the control information may include, for example, one of low-speed control, medium-speed control, and high-speed control. The control information may be set differently for each load. Elements of control information for an arbitrary load may be set for each range of consumed power, but there is no limitation to a setting criterion. The control information may be implemented as an instruction itself for performing an operation that the processor 120 transfers to an arbitrary load. For example, in a case of a motor, the control information may include, for example, clockwise, a torque, information provided directly to the motor, or the like.

The power management circuit 130 according to an embodiment may include a plurality of (e.g., M) regulators (or voltage regulators) 132*a*, 132*b*, 132*c*, and 132*m*. The number (e.g., M) of the regulators 132*a*, 132*b*, 132*c*, and 132*m* may be equal to, or greater or less than the number (e.g., N) of a plurality of sensors 134*a*, 134*b*, 134*c*, and 134*n*. Each of the plurality of (e.g., M) regulators 132*a*, 132*b*, 132*c*, and 132*m* may include, for example, a circuit configured to maintain a voltage of power output from each of the plurality of (e.g., M) regulators 132*a*, 132*b*, 132*c*, and 132*m*. For example, each of the plurality of (e.g., M) regulators 132*a*, 132*b*, 132*c*, and 132*m* may adjust at least one of a magnitude of a current and/or a magnitude of a voltage of a received power and output the adjusted power. Each of the plurality of (e.g., M) regulators 132*a*, 132*b*, 132*c*, and 132*m* may suppress (or remove) noise (or a ripple). Each of the plurality of (e.g., M) regulators 132*a*, 132*b*, 132*c*, and 132*m* may include, e.g., a linear dropout (LDO) regulator (e.g., RT9011 model or AP7343 model), a step-down regulator (e.g., LM3655 model or TPS54331 model), or the like, but it will be appreciated by one of ordinary skill in the art that the regulators are not limited to a specific type or model. According to implementation, a regulator may be referred to, for example, as a DC/DC convertor. According to an embodiment, at least some of the plurality of (e.g., M) regulators 132*a*, 132*b*, 132*c*, and 132*m* may be of the same type. For example, all of the plurality of (e.g., M) regulators 132*a*, 132*b*, 132*c*, and 132*m* may be of the same type or at least some of the plurality of (e.g., M) regulators 132*a*, 132*b*, 132*c*, and 132*m* may be of a different type. The plurality of (e.g., M) regulators 132*a*, 132*b*, 132*c*, and 132*m* may be connected to a switching circuit 133.

According to an embodiment, the switching circuit 133 may selectively connect each of the plurality of (e.g., M) regulators 132*a*, 132*b*, 132*c*, and, 132*m* to at least some of the plurality of (e.g., N) sensors 134*a*, 134*b*, 134*c*, and 134*n*. For example, one (e.g., a first regulator 132*a*) of the plurality of (e.g., M) regulators 132*a*, 132*b*, 132*c*, and 132*m* may be connected to one or more of the plurality of (e.g., N) sensors 134*a*, 134*b*, 134*c*, and 134*n* via the switching circuit 133. The switching circuit 133 may include a plurality of switches which connect each of the plurality of (e.g., M) regulators 132*a*, 132*b*, 132*c*, and 132*m* to at least one of the plurality of (e.g., N) sensors 134*a*, 134*b*, 134*c*, and 134*n*. Each of the plurality of switches included in the switching circuit 133 may be controlled to be turned on or turned off based on a control signal from, e.g., the MCU 131. Each of the plurality of switches may be implemented with, e.g., various types of MOSFETs, and a state of each switch may be controlled as a voltage applied to a gate is adjusted, and there is no limitation thereof. In the present disclosure, an operation of applying a specific voltage to a gate so that a switch is controlled to turn on may be performed by the electronic device 101 (e.g., the MCU 131). If no specific voltage is applied to the gate, the switching circuit 133 may also be represented as being controlled by the electronic device 101 (e.g., the MCU 131).

According to an embodiment, the MCU 131 may output a control signal of the switching circuit 133 based on information received from the processor 120. The MCU 131 may receive data from the processor 120 or transfer data to the processor 120 based on various inter-chip interfaces, e.g., SPI, I2C, GPIO, UART, or ADC, and/or the like and the inter-chip interfaces are not limited to a specific type. The MCU 131 may be implemented with a chip capable of processing received information and outputting a switch control signal, and is not limited to a specific type. According to implementation, if the processor is implemented with an AP, the MCU 131 may be implemented with a chip whose computation capability is lower than the AP, and there is no limitation to an implementation form thereof. The MCU 131 may receive, from the processor 120, information (e.g., state information and/or control information) related to an operation of at least one load. The MCU 131 may identify a power usage range based on the information related to the operation of the at least one load. The MCU 131 may identify a load which operates abnormally based on a comparison result between a sensed power received from at least some of the plurality of sensors 134*a*, 134*b*, 134*c*, and 134*n* and the power usage range. For example, the MCU 131 may receive voltage values and current values from the plurality of sensors 134*a*, 134*b*, 134*c*, and 134*n*, and calculate power values based on the received voltage values and current values. The plurality of sensors 134*a*, 134*b*, 134*c*, and 134*n* may sense voltage values and current values, and may be implemented to calculate power values based on the sensed voltage values and current values. In this case, the MCU 131 may receive power values from the plurality of sensors 134*a*, 134*b*, 134*c*, and 134*n*. Those skilled in the art will understand that, in the present disclosure, a fact that the MCU 131 receives powers sensed from the plurality of sensors 134*a*, 134*b*, 134*c*, and 134*n* may refer, for example, to the MCU 131 receiving voltage values and current values to calculate power values, or receiving power values. An abnormal operation of an arbitrary load may refer, for example, to a magnitude of a power input to the arbitrary load being outside a range of an expected proper power.

According to an embodiment, the MCU 131 may provide the processor 120 with abnormal operation information and/or normal operation information. The MCU 131 may control a corresponding regulator and/or the switching circuit 133 to stop providing power to a load which operates abnormally. For simplicity, FIG. 1A shows that the MCU 131 controls an Mth regulator 132*m*, however, those skilled in the art will understand that the MCU 131 may control all of the plurality of regulators 132*a*, 132*b*, 132*c*, and 132*m*. In addition, for simplicity, FIG. 1A shows that the MCU 131 receives sensed data from an Nth sensor 134*n*, however, those skilled in the art will understand that the MCU 131 may receive sensed data from all of the plurality of sensors 134*a*, 134*b*, 134*c*, and 134*n*.

According to an embodiment, the plurality of sensors 134*a*, 134*b*, 134*c*, and 134*n* may sense a magnitude of a power output from a regulator and/or a magnitude of a power input to a load. Each of the plurality of sensors 134*a*, 134*b*, 134*c*, and 134*n* may be connected to each of the plurality of loads 140*a*, 140*b*, 140*c*, and 140*n*, thereby sensing the magnitude of the power input to the load. Each of the plurality of sensors 134*a*, 134*b*, 134*c*, and 134*n* is not limited as long as it is a sensor capable of sensing a magnitude of a power.

According to an embodiment, the MCU 131 may select a regulator to be operated based on the information related to the operation of the load from the processor 120. For example, the MCU 131 may provide a control signal of the switching circuit based on the information related to the operation of the load. The MCU 131 may transfer switch on/off control information capable of controlling an on/off state of switches to the switching circuit 133. A state of each of switches in the switching circuit 133 may be controlled to be an on state or an off state based on the received switch on/off control information. The switch on/off control information may be transferred directly to the switches. The switching circuit 133 may include an element for generating control signals. In this case, the element for generating the control signal may generate a control signal for controlling a state of at least one of the switches using the switch on/off control information and transfer the generated control signal. According to a plurality of switch connection configurations of the switching circuit 133, one regulator may be connected to one load (e.g., a first load 140*a*), or a plurality of regulators may be connected to the load. For example, the MCU 131 may determine a regulator to be connected to the load so that efficiency of the regulator satisfies a designated condition (e.g., efficiency equal to or greater than threshold efficiency). The efficiency of the regulator may be different depending on a magnitude of an output current. The MCU 131 may select one or a plurality of regulators connected to an arbitrary load, and may select a regulator so that the efficiency of the regulator satisfies the designated condition. For example, if a current output from a specific regulator has a first magnitude, the specific regulator may have a first efficiency and, if the current output from the regulator has a second magnitude, the specific regulator may have a second efficiency, and the first efficiency may be relatively high. This may refer, for example, to the specific regulator operating in a relatively high efficiency if the first magnitude of current is output from the specific regulator. The MCU 131 may select a regulator based on at least one selected load so that efficiency of a driven regulator has maximum efficiency. The driven regulator having the maximum efficiency may refer, for example, to the overall efficiency of the selected regulator being high as compared with efficiency of another combination of regulators other than the selected regulator. If a first load 140*a* is determined to be operated, the first load 140*a* may require a second magnitude of current. Rather than driving one regulator to output the second magnitude of current, the MCU 131 may perform control so that each of two regulators outputs a first magnitude of current. In this case, the overall efficiency of the two regulators may be higher than efficiency of one regulator and various examples related thereto will be described below in greater detail. The MCU 131 may control the switching circuit 133 so that the at least one selected regulator is connected to a load.

According to an embodiment, each of the plurality of loads 140*a*, 140*b*, 140*c*, and 140*n* may include, for example, a component, or a set of components, of the electronic device 101, which consumes power. For example, if the electronic device 101 is implemented with a robot, the loads may include a processor, a memory, a communication circuit, a display for displaying a screen, a speaker for outputting voice, a microphone for obtaining voice, a sensor, and an actuator, but are not limited thereto. The term "load" may also be referred to as hardware, a client, a peripheral device, a power consuming element, or an element. The term "load" may refer, for example, to one component of the electronic device 101 or may also refer, for example, to a set of a plurality of components of the electronic device 101. For example, if the electronic device 101 is implemented with a human robot, the first load 140*a* may be a display, however, the first load may be a display included in a head unit, an actuator for driving the head unit, or a speaker included in the head unit.

Figure 1B:
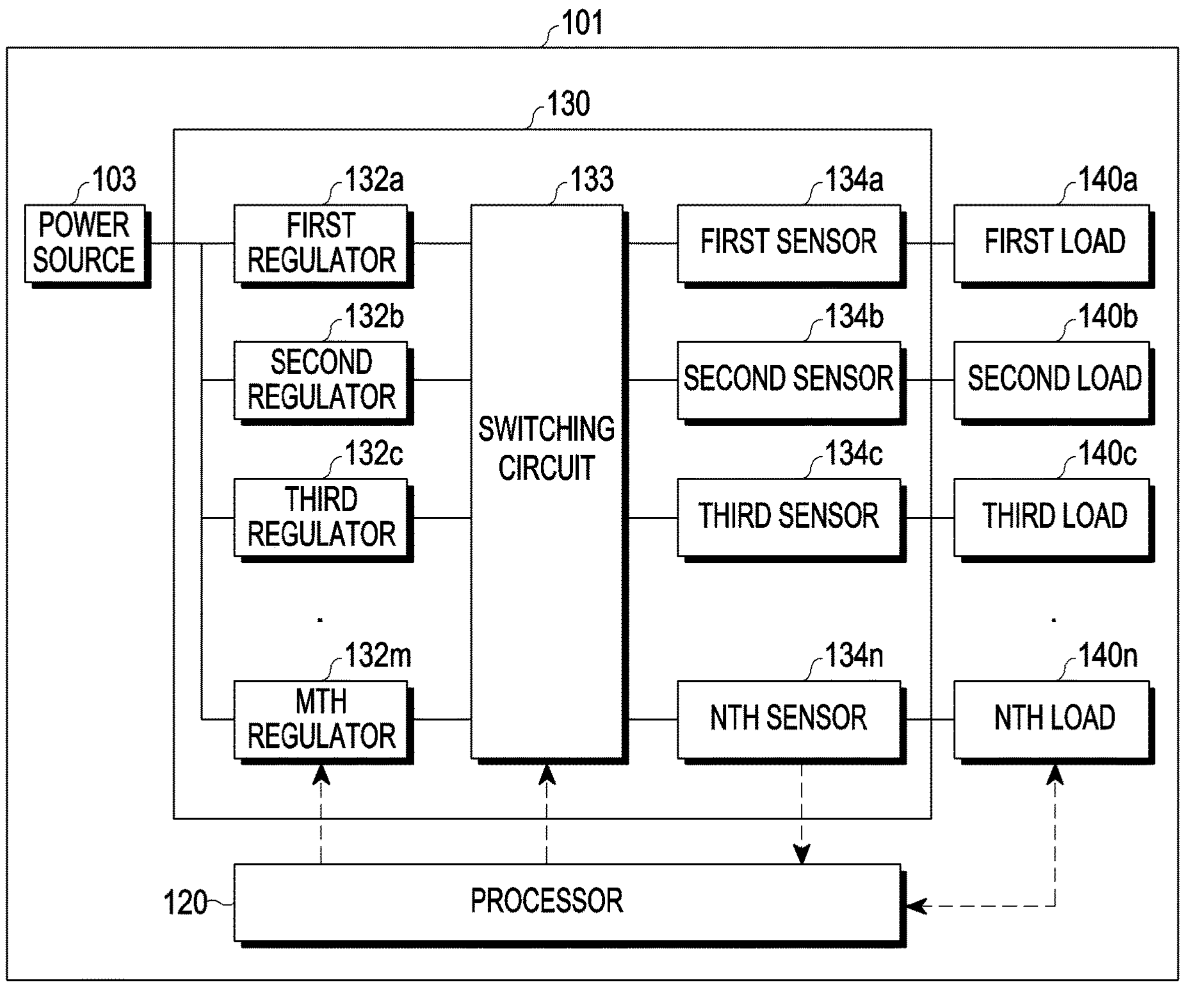
FIG. 1B is a block diagram illustrating an example electronic device according to an embodiment.

FIG. 1B is a block diagram illustrating an example electronic device according to an embodiment.

A power management circuit 130 of an electronic device 101 according to an embodiment in FIG. 1B may not include an MCU 131 as compared with a power management circuit 130 in FIG. 1A. A processor 120 outside the power management circuit 130 according to an embodiment may determine on/off control information for switches included in a switching circuit 133. As set forth above, the processor 120 may determine information related to an operation of a load. The processor 120 may identify a power usage range for each load based on the information related to the operation of the load. A plurality of sensors 134*a*, 134*b*, 134*c*, and 134*n* may sense a magnitude of a power input to each load. The processor 120 may receive, from the plurality of sensors 134*a*, 134*b*, 134*c*, and 134*n*, a sensed magnitude of the power input to each load. The processor 120 may compare the identified power usage range and the sensed magnitude of the power, and identify a load which operates abnormally based on a comparison result. The processor 120 may control a regulator and/or the switching circuit 133 to stop providing a power to the load which operates abnormally. For example, the processor 120 may transfer switch on/off control information for controlling on/off states of switches within the switching circuit 133 to the power management circuit 130. A state of each of the switches within the switching circuit 133 may be controlled to be an on state or an off state based on the received switch on/off control information. The switch on/off control information may be transferred directly to the switches. The switching circuit 133 may include an element for generating a control signal. In this case, the element for generating the control signal may generate a control signal for controlling a state of at least one of the switches using the switch on/off control information and transfer the generated control signal. The processor 120 may control the load which operates abnormally to stop a corresponding operation thereof and to perform the corresponding operation again, or may reset the load. Alternatively, the processor 120 may change operation information of the load.

According to an embodiment, the processor 120 may identify an abnormal operation of a load, not based on sensing data for a magnitude of a power from a sensor. For example, the processor 120 may output control information to a motor so that the electronic device 101 moves at a speed of 3 m/s. The processor 120 may identify that the electronic device 101 moves at a speed of 6 m/s from a speed sensor. The processor 120 may identify that the motor operates abnormally, and may control a regulator corresponding to the motor and/or a switch corresponding to the motor to stop providing a power to the motor.

As shown in FIG. 1B, in embodiments of the present disclosure, the power management circuit 130 in which the MCU 131 is excluded may be implemented. In this case, an operation performed by the MCU 131 may be performed by the processor 120. Those skilled in the art will understand that, in the present disclosure, a fact that the MCU 131 performs a specific operation may be replaced with a fact that the processor 120 performs the specific operation.

Figure 1C:
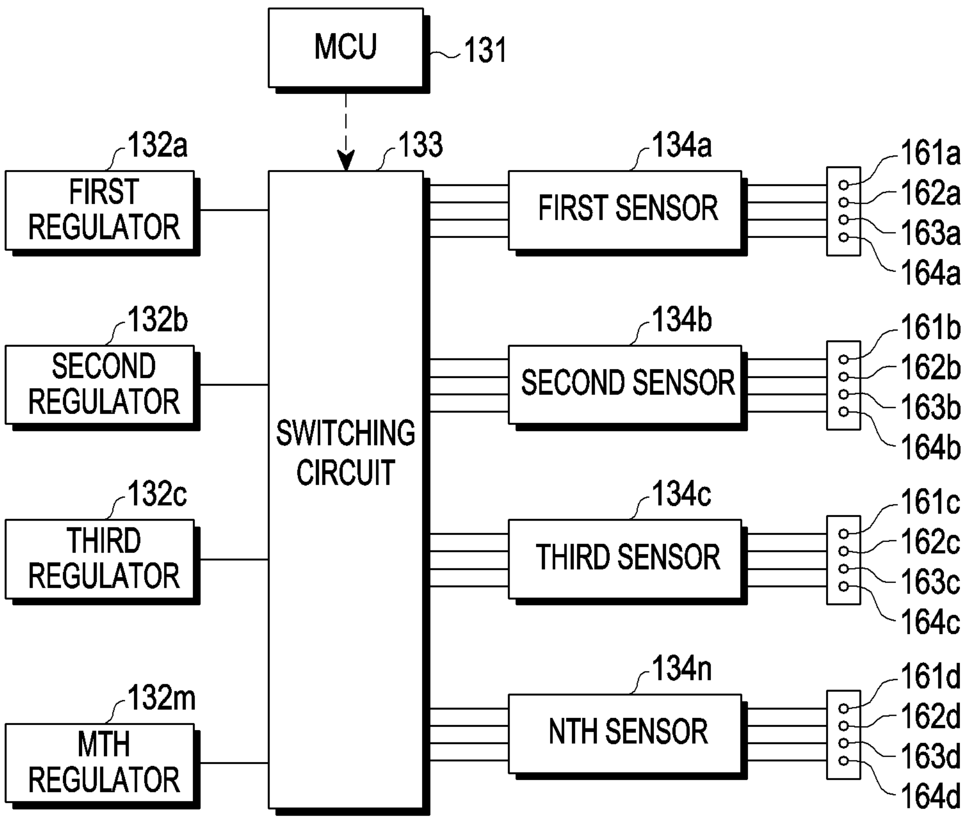
FIG. 1C is a diagram illustrating an example power management circuit according to an embodiment.

FIG. 1C is a diagram illustrating an example power management circuit according to an embodiment. For example, an embodiment in FIG. 1C may, for example, be an alternative embodiment for a power management circuit 130 in FIG. 1A.

According to an embodiment, each of a plurality of sensors 134*a*, 134*b*, 134*c*, and 134*d* in the power management circuit 130 may be connected to a plurality of sub-ports 161*a*, 162*a*, 163*a*, 164*a*, 161*b*, 162*b*, 163*b*, 164*b*, 161*c*, 162*c*, 163*c*, 164*c*, 161*d*, 162*d*, 163*d*, and 164*d*. A plurality of sub-ports 161*a*, 162*a*, 163*a*, and 164*a* may be configured to output different voltages, but are not limited thereto. In an embodiment, a first load 140*a* may require two or more voltages (e.g., 12V, 5V, and 3.3V). In this case, the first load 140*a* may be connected to a first sub-port 161*a*, a second sub-port 162*a*, and a third sub-port 163*a* to receive a processed power from each of a first regulator 132*a*, a second regulator 132*b*, and a third regulator 132*c*. A second load 140*b* may require a power of a single voltage, e.g., 12V. The second load 140*b* may be connected to, e.g., the first sub-port 161*a* and a fifth sub-port 161*b* to receive powers from the first regulator 132*a* and a fourth regulator 132*d*. A third load 140*c* may require a power of a single voltage, e.g., 12V. The third load 140*c* may be connected to, e.g., a ninth sub-port 161*c* to receive a power from a fifth regulator 132*e*.

Figure 2A:
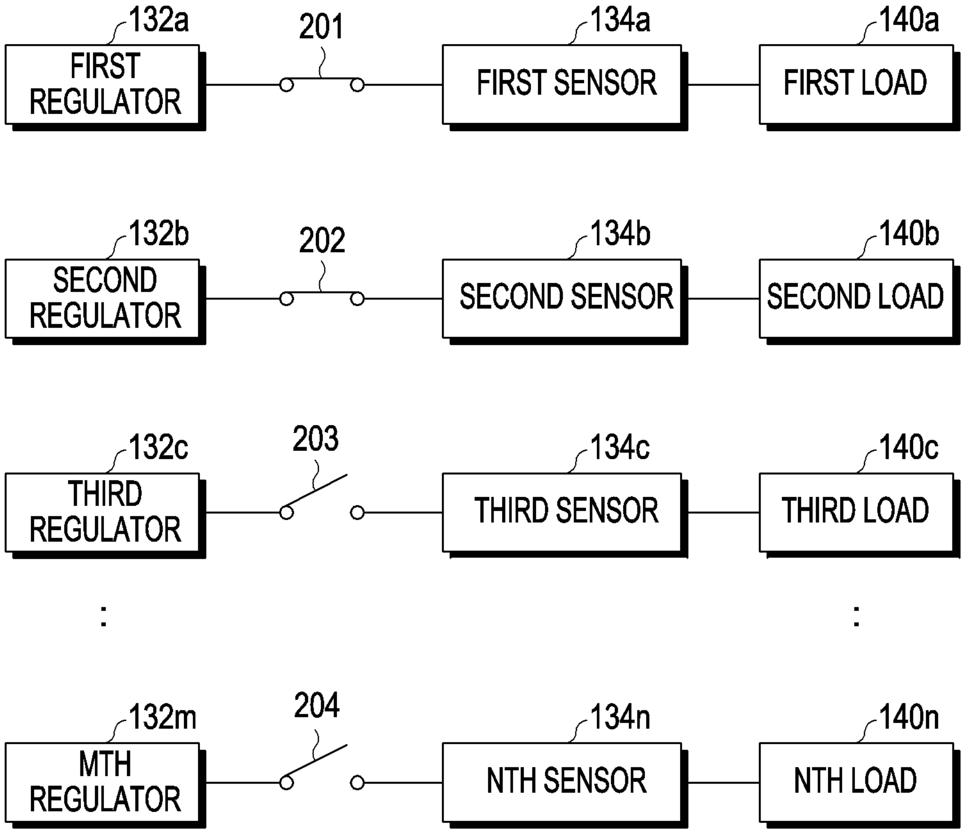
FIG. 2A is a diagram illustrating an example structure of a switching circuit according to an embodiment.

FIG. 2A is a diagram illustrating an example structure of a switching circuit according to an embodiment. FIG. 2A illustrates, for example, a detailed structure of a switching circuit 133 in FIG. 1A.

According to an embodiment, a switching circuit 133 may include a first switch 201, a second switch 202, a third switch 203, and a fourth switch 204. For example, M (the number of regulators) may be equal to N (the number of sensors), and the number of switches may also be M (or N). Each of the plurality of switches 201, 202, 203, and 204 may be connected to each of a plurality of regulators 132*a*, 132*b*, 132*c*, and 132*m*, and may be connected to each of a plurality of sensors 134*a*, 134*b*, 134*c*, and 134*n*.

In an embodiment in FIG. 2A, the first switch 201 and the second switch 202 may be controlled to be in an on state, and the third switch 203 and the fourth switch 204 may be controlled to be in an off state. For example, a processor 120 may determine to drive a first load 140*a* and a second load 140*b*, and determine not to drive a third load 140*c* and an nth load 140*n*. The processor 120 may provide an MCU 131 or each switch with a switch control signal. The processor 120 may provide the MCU 131 with information related to an operation of the first load 140*a* and information related to an operation of a second load 140*b*. The MCU 131 may identify an appropriate power usage range for the first load 140*a* based the information related to the operation of the first load 140*a*, and identify an appropriate power usage range for the second load 140*b* based the information related to the operation of the second load 140*b*. The MCU 131 may compare a magnitude of a power received from a first sensor 134*a* with the appropriate power usage range for the first load 140*a*, and may compare a magnitude of a power received from a second sensor 134*b* with the appropriate power usage range for the second load 140*b*. The MCU 131 may identify whether the first load 140*a* or the second load 140*b* operates abnormally based on a comparison result. If it is identified that the first load 140*a* operates abnormally, the MCU 131 may report information indicating that the first load 140*a* operates abnormally to the processor 120. The processor 120 may control to stop the operation of the first load 140*a*, or reset the first load 140*a*. If it is identified that the first load 140*a* operates abnormally, the MCU 131 may control a first regulator 132*a* and/or a first switch 201 to stop providing the first load 140*a* with a power. For example, the MCU 131 may control the first regulator 132*a* not to operate. For example, the MCU 131 may control the first switch 201 to be in an off state. Even if the processor 120 operates abnormally, the MCU 131 may immediately stop providing the first regulator 132*a* with a power, so the operation of the first load 140*a* may be stopped, thereby preventing and/or reducing a safety accident.

Figure 2B:
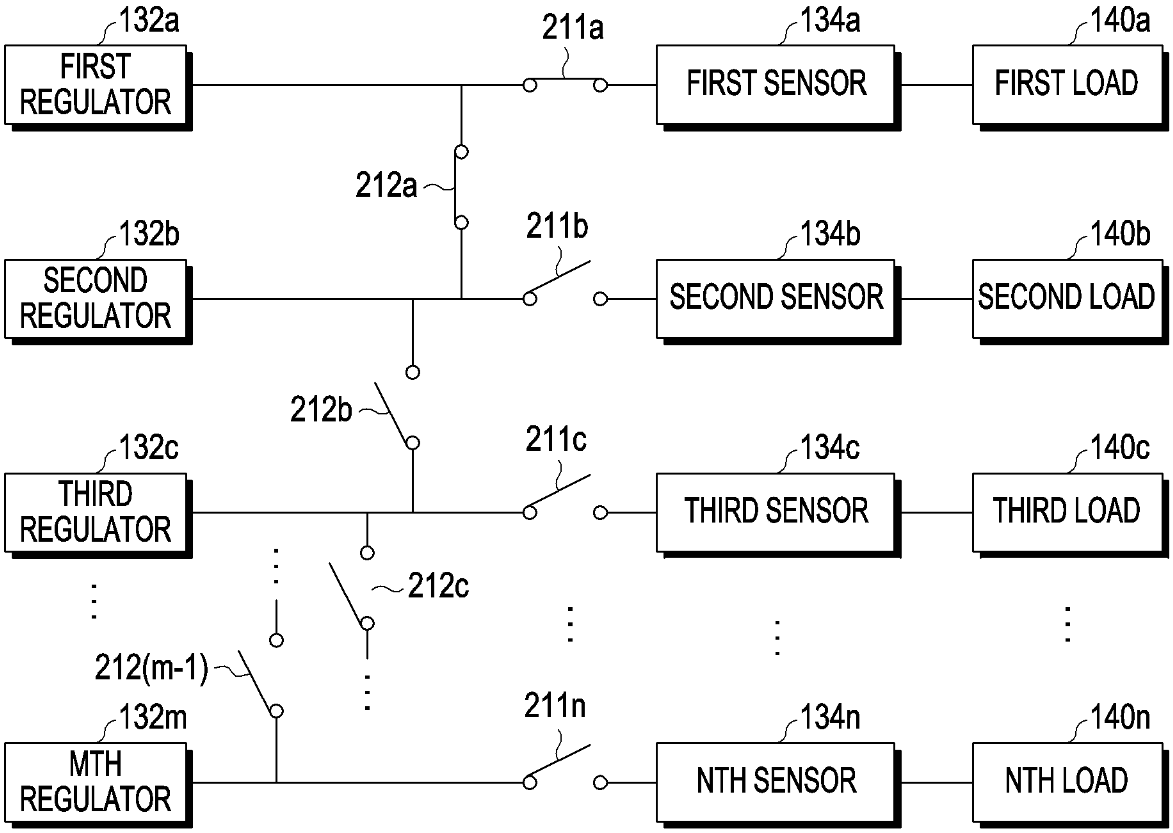
FIG. 2B is a diagram illustrating an example structure of a switching circuit according to an embodiment.

FIG. 2B is a diagram illustrating an example structure of a switching circuit according to an embodiment. FIG. 2B illustrates, for example, a detailed structure of a switching circuit 133 in FIG. 1A.

In another example, the switching circuit 133 may include a first output switch 211*a* connected to a first sensor 134*a*, a second output switch 211*b* connected to a second sensor

134*b*, a third output switch 211*c* connected to a third sensor 134*c*, and an nth output switch 211*n* connected to an nth sensor 134*n*. The switching circuit 133 may include a first connection switch 212*a* selectively connecting a path from a first regulator 132*a* and a path from a second regulator 132*b*, a second connection switch 212*b* selectively connecting the path from the second regulator 132*b* and a path from a third regulator 132*c*, a third connection switch 212*c* selectively connecting the path from a third regulator 132*c* and a path from a fourth regulator (not shown), and an m−1th connection switch 212(*m*−1) selectively connecting a path from an m−1th regulator (not shown) and a path from an mth regulator 132*m*.

For example, as in FIG. 2B, it may be determined to connect the first regulator 132*a* and the second regulator 132*b* to a first load 140*a*. If the first regulator 132*a* and the second regulator 132*b* provide the first load 140*a* with a power together, efficiency of a regulator may be maximized, and accordingly, the MCU 131 may control a switch to connect the first regulator 132*a* and the second regulator 132*b* to the first load 140*a*. For example, the MCU 131 may control the first output switch 211*a* and the first connection switch 212*a* to be in an on state, and control remaining switches to be in an off state. The processor 120 may provide the MCU 131 with information related to an operation of the first load 140*a*. The MCU 131 may identify an appropriate power usage range for the first load 140*a* based on the information related to the operation of the first load 140*a*. The MCU 131 may compare a magnitude of a sensed power received from the first sensor 134*a* with the appropriate power usage range for the first load 140*a*, and identify whether the first load 140*a* operates abnormally based on a comparison result. If it is identified that the first load 140*a* operates abnormally, the MCU 131 may report information indicating that the first load 140*a* operates abnormally to the processor 120. The processor 120 may control to stop the operation of the first load 140*a*, or reset the first load 140*a*. If it is identified that the first load 140*a* operates abnormally, the MCU 131 may control the first regulator 132*a* and/or the first output switch 211*a*, and the first connection switch 212*a* to stop providing the first load 140*a* with a power. For example, the MCU 131 may control the first regulator 132*a* not to operate. For example, the MCU 131 may control the first output switch 211*a* and the first connection switch 212*a* to be in an off state.

Figure 2C:
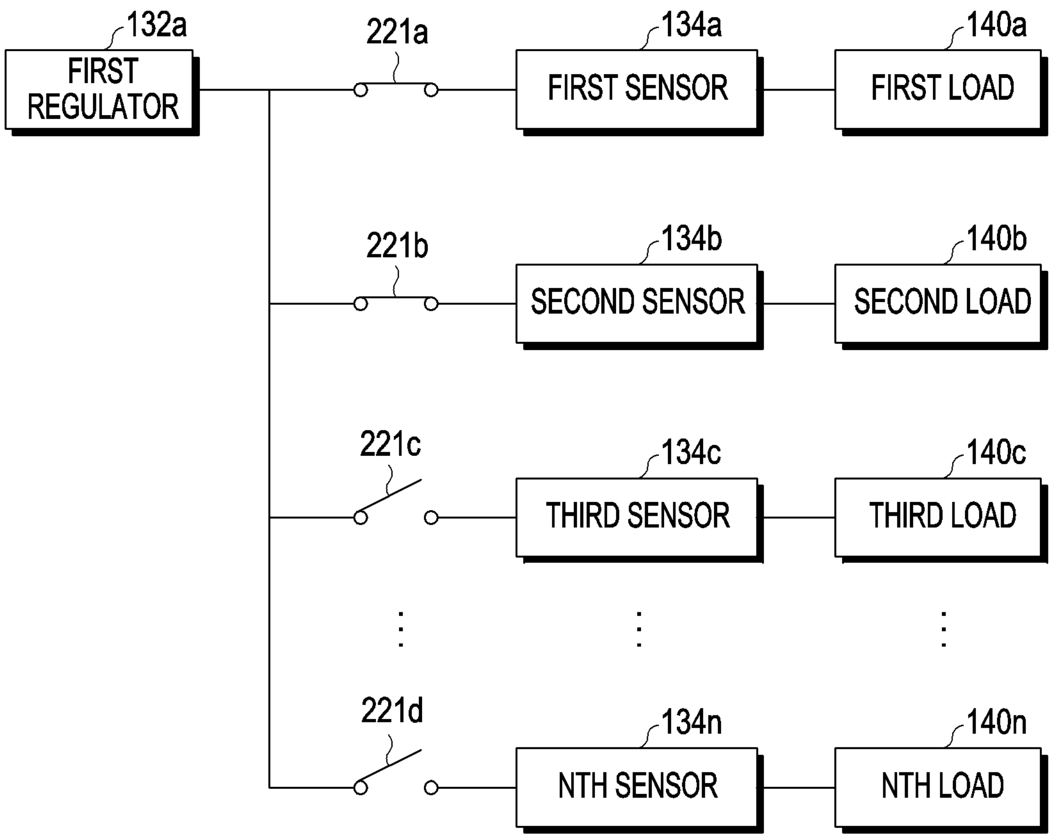
FIG. 2C is a diagram illustrating an example switch within a switching circuit according to an embodiment.

FIG. 2C is a diagram illustrating an example switch within a switching circuit according to an embodiment. FIG. 2C illustrates, for example, a detailed structure of a switching circuit 133 in FIG. 1A.

The switching circuit 133 according to an embodiment may include a plurality of switches 221*a*, 221*b*, 221*c*, and 221*d* for selectively connecting a first regulator 132*a* to each of a plurality of sensors 134*a*, 134*b*, 134*c*, and 134*n*. In addition, although not shown for convenience of description, the switching circuit 133 may include a plurality of switches for selectively connecting at least one remaining regulator to each of the plurality of sensors 134*a*, 134*b*, 134*c*, and 134*n*. For example, the switching circuit 133 may include M*N switches. For example, an electronic device 101 may control the first regulator 132*a* to be connected to the first load 140*a*. In this case, the electronic device 101 may control a switch 221*a* to be in an on state, and control remaining switches to be in an off state. In addition, the electronic device 101 may control switches which correspond to remaining regulators to be in the off state. In another embodiment, the first regulator 132*a* may be connected to some of a plurality of loads 140*a*, 140*b*, 140*c*, and 140*n*. In this case, a switch for selectively connecting the first regulator 132*a* to the corresponding load may be connected to the first regulator 132*a*.

Figure 3A:
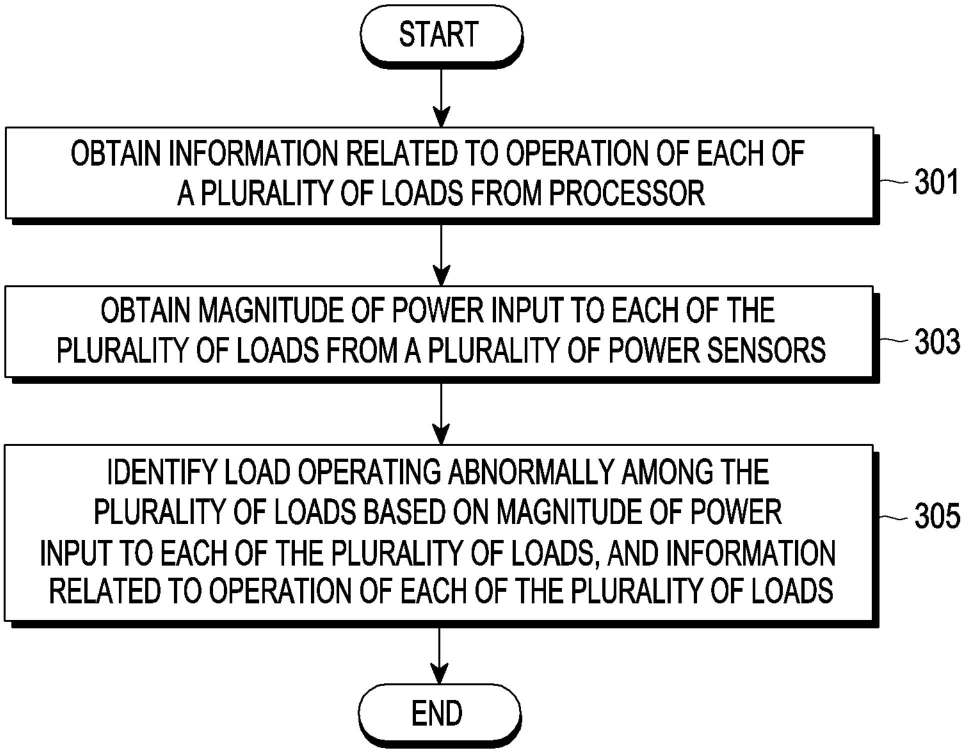
FIG. 3A is a flowchart illustrating an example method of operating an electronic device according to an embodiment.

FIG. 3A is a flowchart illustrating an example method of operating an electronic device according to an embodiment. Operations in FIG. 3A may be performed, for example, by a processor 120 alone, which is outside a power management circuit 130 in FIG. 1A, or an MCU 131 alone, which is within the power management circuit 130, or may be performed by the processor 120 outside the power management circuit 130 and the MCU 131 within the power management circuit 130. An order of performing the operations in FIG. 3A is not limited to that shown in FIG. 3A, and an order of performing some operations may be changed. More operations may be added between consecutive operations, and some of the operations in FIG. 3A may not be performed. What has been described above may apply likewise to other flowcharts of the present disclosure.

According to an embodiment, an electronic device 101 (e.g., an MCU 131) may obtain information related to an operation of each of a plurality of loads 140*a*, 140*b*, 140*c*, and 140*n* from a processor 120 in operation 301. As described above, information related to an operation of a specific load may include at least one of state information of the specific load or control information of the specific load. If the MCU 131 is not included in the power management circuit 130, the processor 120 may identify the information related to the operation of each of the plurality of loads 140*a*, 140*b*, 140*c*, and 140*n*.

In operation 303, the electronic device 101 may obtain a magnitude of a power input to each of the plurality of loads 140*a*, 140*b*, 140*c*, and 140*n* from a plurality of power sensors 134*a*, 134*b*, 134*c*, and 134*n*. If some of the plurality of loads 140*a*, 140*b*, 140*c*, and 140*n* operate, the electronic device 101 may identify information about operations of some of the plurality of loads 140*a*, 140*b*, 140*c*, and 140*n* and obtain a magnitude of a power input to each of some of the plurality of loads 140*a*, 140*b*, 140*c*, and 140*n*.

In operation 305, the electronic device 101 may identify a load which operates abnormally among the plurality of loads 140*a*, 140*b*, 140*c*, and 140*n* based on the magnitude of the power input to each of the plurality of loads 140*a*, 140*b*, 140*c*, and 140*n*, and the information related to the operation of each of the plurality of loads 140*a*, 140*b*, 140*c*, and 140*n*.

Figure 3B:
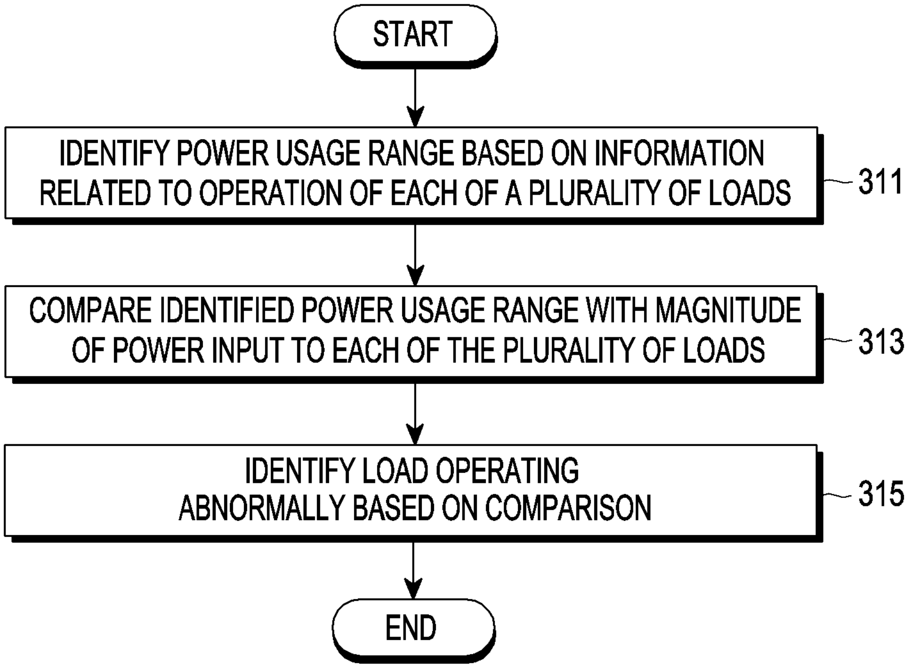
FIG. 3B is a flowchart illustrating an example method of operating an electronic device according to an embodiment.

FIG. 3B is a flowchart illustrating an example method of operating an electronic device according to an embodiment. Operations in FIG. 3B may, for example, be at least part of an operation of identifying a load which operates abnormally among a plurality of loads 140*a*, 140*b*, 140*c*, and 140*n* based on a magnitude of a power input to each of the plurality of loads 140*a*, 140*b*, 140*c*, and 140*n* and information related to an operation of each of the plurality of loads 140*a*, 140*b*, 140*c*, and 140*n* in operation 305 in FIG. 3A.

According to an embodiment, an electronic device 101 (e.g., an MCU 131), in operation 311, may identify a power usage range based on information related to an operation of each of the plurality of loads 140*a*, 140*b*, 140*c*, and 140*n*. The information related to the operation of each of the plurality of loads 140*a*, 140*b*, 140*c*, and 140*n* may include, for example, state information. Table 1 is an example of a power usage range for each piece of state information among the information related to the operation of each of the plurality of loads 140*a*, 140*b*, 140*c*, and 140*n*.

TABLE 1

| Load | Sleep State | Idle State | Driven State |
|---|---|---|---|
| First Load (Motor for steering head unit) | [10 mW~50 mW] | [0.1 W~0.15 W] | [2 W~20 W] |
| Second Load (Mobile motor) | [10 mW~50 mW] | [0.5 W~0.8 W] | [20 W~120 W] |
| Third Load (Display) | [5 mW~10 mW] | [0.3 W~0.5 W] | [1 W~10 W] |
| Fourth Load (Communication Module) | [5 mW~10 mW] | [0.3 W~0.5 W] | [1 W~5 W] |
| Fifth Load (Processor) | [10 mW~20 mW] | [0.4 W~0.8 W] | [1 W~5 W] |

According to an embodiment, the electronic device 101 may store the information about the power usage range for each piece of state information as shown in Table 1. The state information may be stored in a memory accessible by the MCU 131, and the memory may be disposed in at least one of the inside or outside of a power management circuit 130. The MCU 131 may receive information related to an operation indicating that a state of a first load is a sleep state, for example, from the processor 120. The information indicating that the state of the first load is the sleep state may be expressed by, for example, an identifier, and there is no limitation to an expression format. The MCU 131 may identify that a power usage range which corresponds to the first load is 10 mW to 50 mW. The MCU 131 may receive a magnitude of a sensed power input to the first load from a sensor.

According to an embodiment, in operation 313, the electronic device 101 may compare the identified power usage range with a magnitude of a power input to each of the plurality of loads **140*a*, 140*b*, 140*c*, and 140*n*. In operation 315, the electronic device 101 may identify a load which operates abnormally based on a result of the comparison. For example, if the magnitude of the power is included within the corresponding power usage range, the MCU 131 may identify that the first load operates normally. If the magnitude of the power is not included in the corresponding power usage range, the MCU 131 may identify that the first load operates abnormally. For example, as the first load (a motor for steering a head unit) is identified to be in a sleep state, if a magnitude of a power input to the first load is 30 mW which is included in a range from 10 mW to 50 mW which corresponds to the sleep state, the electronic device 101 may identify that the first load operates normally. For example, as the first load (the motor for steering the head unit) is identified to be in the sleep state, if the magnitude of the power input to the first load is 80 mW which is not included in the range from 10 mW to 50 mW which corresponds to the sleep state, the electronic device 101** may identify that the first load operates abnormally.

Table 2 is an example of a power usage range for each control information among the information related to the operation of each of the plurality of loads **140*a*, 140*b*, 140*c*, and 140*n***.

TABLE 2

| Load | First Control Information | Second Control Information | Third Control Information |
|---|---|---|---|
| First Load (Motor for steering head unit) | Low-Speed Rotation [2 W~5 W] | Medium-Speed Rotation [5 W~10 W] | High-Speed Rotation [10 W~20 W] |
| Second Load (Mobile motor) | Constant-Speed Movement [20 W~50 mW] | Acceleration Movement [50 W~80 W] | Initial Movement [80 W~120 W] |
| Third Load (Display) | First Brightness [1 W~3 mW] | Second Brightness [3 W~6 W] | Third Brightness [6 W~10 W] |

According to an embodiment, the MCU 131 may store information about a power usage range for each piece of control information as shown in Table 2. The MCU 131 may receive information related to an operation indicating that control information of the first load is first control information (e.g., a low-speed rotation) from, for example, the processor 120. Information indicating the first control information may be expressed by, for example, an identifier, and there is no limitation on an expression format thereof. The MCU 131 may identify that a power usage range which corresponds to the first load is 2 W to 5 W. The MCU 131 may receive a magnitude of a sensed power input to the first load from a sensor. If the magnitude of the power is included in the corresponding power usage range, the MCU 131 may identify that the first load operates normally. If the magnitude of the power is not included in the corresponding power usage range, the MCU 131 may identify that the first load operates abnormally.

In Tables 1 and 2 described above, although each range is expressed as not overlapping with each other, this is merely an example and the two ranges may overlap at least partially. For example, a part of the power usage range corresponding to the sleep state of the first load in Table 1 may be set to overlap with a part of a power usage range corresponding to an idle state.

According to an embodiment, the processor 120 may provide the MCU 131 with an appropriate power usage range for each load instead of information related to an operation of a load. The MCU 131 may also identify whether each load operates abnormally by comparing a received power usage range with a magnitude of a sensed power.

Even if it has been described that the MCU 131 obtains the information related to the operation of the load including the control information and/or the state information, and identifies whether the load operates abnormally based on the information related to the operation of the load and the power usage range, this is merely an example. In another embodiment, the MCU 131 may receive a power usage range for each load, and in this case, the power usage range for each load may be expressed as being included in the information related to the operation of the load.

Figure 4:
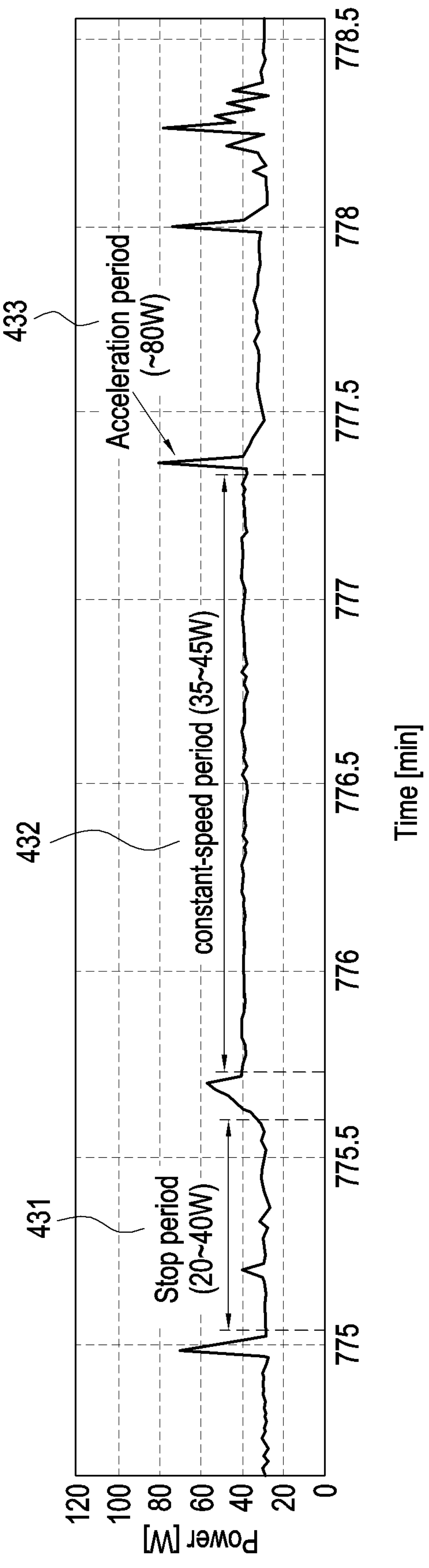
FIG. 4 is a diagram illustrating example sensing data for power consumed by a load according to an embodiment.

FIG. 4 is a diagram illustrating example sensing data for power consumed by a load according to an embodiment. FIG. 4 illustrates, for example, time series consumed power magnitudes of a specific load obtained by a processor 120 and/or an MCU 131 in FIG. 1A.

According to an embodiment, a sensor connected to a load (e.g., a mobile motor) may sense data as illustrated in FIG. 4. An x-axis in FIG. 4 indicates time (in minutes), and a y-axis indicates power in watts (W). Sensed data may be provided to the MCU 131. A first time period 431 for the sensed data may be, for example, a period in which an electronic device 101 is stopped. If an event for a movement of the electronic device 101 is not identified, the processor 120 may determine state information of the load (e.g., the mobile motor) as, for example, an idle state. The processor 120 may provide the load (e.g., the mobile motor) with the state information as the idle state, and the load (e.g., the mobile motor) may be in the idle state based on the state information. The processor 120 may provide the MCU 131 with the state information of the load (e.g., the mobile motor). The MCU 131 may identify a power usage range which corresponds to the state information (e.g., the idle state) of the load (e.g., the mobile motor). The MCU 131 may compare at least one data during the first time period 431 with the identified power usage range. The MCU 131 may identify whether the load (e.g., the mobile motor) operates abnormally based on a comparison result. For example, the MCU 131 may identify whether the load (e.g., the mobile motor) operates abnormally based on the number of data which exceeds the power usage range among a plurality of data, a ratio of a total number of the plurality of data to the number of data which exceeds the power usage range, and/or the like.

During a second time period 432, the processor 120 may determine to move at a constant speed. During the second time period 432, the processor 120 may provide the load (e.g., the mobile motor) with the state information indicating an activated state and control information indicating a constant-speed movement. The load (e.g., the mobile motor) may operate based on received information, and accordingly, the electronic device 101 may move at the constant speed. The processor 120 may provide the MCU 131 with the state information indicating the activated state and the control information indicating the constant-speed movement. The MCU 131 may identify a power usage range which corresponds to the control information indicating the constant-speed movement. The MCU 131 may identify whether the load (e.g., the mobile motor) operates abnormally based a comparison result between data sensed during the second time period 432 and the identified power usage range.

During a third time period 433, the processor 120 may determine to move in an accelerated manner. During the third time period 433, the processor 120 may provide the load (e.g., the mobile motor) with state information indicating the activated state and control information indicating an acceleration movement. As the load (e.g., the mobile motor) has already entered the activated state, the processor 120 may provide the load (e.g., the mobile motor) with the control information indicating the acceleration movement. The load (e.g., the mobile motor) may operate based on received information, and accordingly, the electronic device 101 may move with the acceleration. The processor 120 may provide the MCU 131 with the state information indicating the activated state and the control information indicating the acceleration movement. The MCU 131 may identify a power usage range which corresponds to the control information indicating the acceleration movement. The MCU 131 may identify whether the load (e.g., the mobile motor) operates abnormally based on a comparison result between data sensed during the third time period 433 and the identified power usage range.

If it is identified that the load (e.g., the mobile motor) operates abnormally, the MCU 131 may stop providing the load (e.g., the mobile motor) with a power, and/or report the abnormal operation of the load (e.g., the mobile motor) to the processor 120. The processor 120 may control an operation of the load (e.g., the mobile motor) and/or reset the load (e.g., the mobile motor).

In another embodiment, the MCU 131 may identify whether a load operates abnormally based on a result of statistical processing for a plurality of data. The MCU 131 may identify information about an average of powers as information related to an operation of the load. The MCU 131 may identify variance for the plurality of data based on, for example, the identified average. If the variance is equal to or less than a threshold variance value, the MCU 131 may identify that the load operates normally. If the variance is greater than the threshold variance value, the MCU 131 may identify that the load operates abnormally. The identifying process according to the variance which is based on the average as the information related to the operation is merely an example, and those skilled in the art that will understand that a statistical procedure may be used to identify whether the load operates normally or abnormally as long as it may indicate difference from an optimal value.

Figure 5:
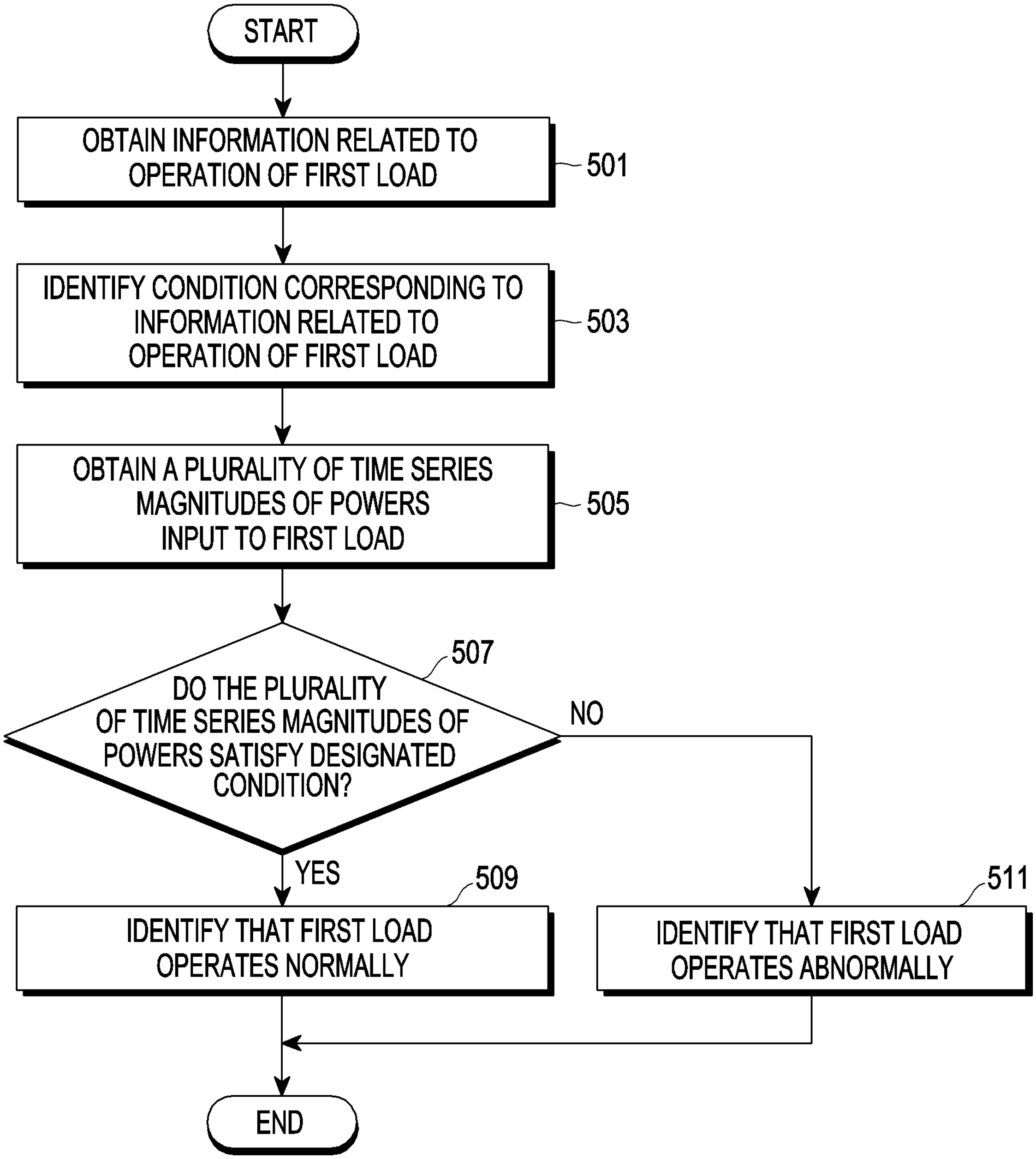
FIG. 5 is a flowchart illustrating an example method of operating an electronic device according to an embodiment.

FIG. 5 is a flowchart illustrating an example method of operating an electronic device according to an embodiment. Operations in FIG. 5 may be performed, for example, by a processor 120 alone, which is outside a power management circuit 130 in FIG. 1A, or an MCU 131 alone, which is within the power management circuit 130, or may be performed by the processor 120 outside the power management circuit 130 and the MCU 131 within the power management circuit 130.

According to an embodiment, an electronic device 101 (e.g., at least one of the processor 120 or the MCU 131) may obtain information related to an operation of a first load in operation 501.

In operation 503, the electronic device 101 may identify a condition corresponding to the information related to the operation of the first load. For example, the condition may be a fact that a ratio of the number of sensed data included in a power usage range which corresponds to the information related to the operation of the first load to a total number of sensed data is greater than or equal to a designated threshold ratio.

In operation 505, the electronic device 101 may obtain a plurality of time series magnitudes of powers input to the first load. In operation 507, the electronic device 101 may identify whether the plurality of time series magnitudes of the powers satisfy a designated condition. For example, the electronic device 101 may identify a ratio of the number of magnitudes of powers included in an identified power usage range to a total number of the plurality of time series magnitudes of the powers. The electronic device 101 may identify whether an identified ratio is greater than or equal to the threshold ratio. If it is identified that the designated condition is satisfied (507—yes), the electronic device 101 may identify that the first load operates normally in operation 509. If it is identified that the designated condition is not satisfied (507—no), the electronic device 101 may identify that the first load operates abnormally in operation 511.

The condition which is based on the ratio of the number of sensed data included in the power usage range corresponding to the information related to the operation of the first load to the total number of sensed data is merely an example, and there is no limitation to a condition for identifying whether a load operates abnormally. In still another embodiment, the electronic device 101 may be implemented to immediately identify that a load operates abnormally if data outside an identified power usage range is identified. In this case, time series data may not be used. In addition, as described above, a designated condition may be set not based on the power usage range, but based on an optimal value (e.g., an average value) which corresponds to a case that the load operates normally and a statistical processing result (e.g., a variance value) which is based on time series data, and there is no limitation thereto.

In an embodiment, the electronic device 101 may identify whether the first load operates normally or abnormally, and identify whether another load (e.g., a second load) operates normally or abnormally. The electronic device 101 (e.g., the MCU 131) may obtain information related to an operation of each of a plurality of loads from the processor 120. For example, the MCU 131 may obtain example information related to operations of the plurality of loads as shown in Table 3.

TABLE 3

| Load | State Information | Control Information |
|---|---|---|
| Motor for steering head unit | Idle State | — |
| Mobile motor | Activated State | Acceleration Movement |
| Display | Activated State | Third Brightness |

As shown in Table 3, the information related to the operations of the plurality of loads may include both state information and control information, or may include one of the state information or the control information. The processor 120 may provide the MCU 131 with information about all loads which are in a turn-on state at a designated period, or based on an event (e.g., an update to the state information and/or the control information, or a request from the MCU 131). The processor 120 may provide the MCU 131 with information related to an operation of a load having an update at each update time point. There is no limitation to a time point when information related to an operation of a load is provided from the processor 120 to the MCU 131, an event for triggering provision of the information, or provided content. According to an embodiment, the electronic device 101 may identify the highest priority. For example, the electronic device 101 may set a priority for each load, and the priority may be set in consideration of a risk of a safety accident. For example, in an embodiment in Table 3, it has been previously recognized that a risk of safety accident for a mobile motor is the highest, so a priority of the mobile motor may be set to the highest. The electronic device 101 may obtain a magnitude of a power input to a target load to be identified. The electronic device 101 may obtain the magnitude of the power from a sensor which corresponds to the target load. The electronic device 101 may receive a magnitude of a power for a sensor for each load at a predetermined period, and the magnitude of the power for the sensor for each load may be obtained from at least some sensor at the same time. The electronic device 101 may identify whether the target load operates abnormally based on a comparison result for a power usage range identified by information related to an operation of the target load. For example, the electronic device 101 may identify a power usage range which corresponds to state information and control information of the mobile motor, which has the highest priority in Table 3. The electronic device 101 may receive a magnitude of a power input to the mobile motor from a sensor. The electronic device 101 may compare a magnitude of a sensed power with an identified power usage range, and identify whether the mobile motor operates abnormally based on a result of the comparison. According to an embodiment, the electronic device 101 may identify whether identification of whether to operate abnormally for all loads is performed. If whether to operate abnormally for all loads is not identified, the electronic device 101 may identify a next priority. For example, in Table 3, a priority of a motor for rotating a head unit may be set to the next priority. The electronic device 101 may obtain a magnitude of a power input to the target load. As described above, in another embodiment, the electronic device 101 may previously obtain a magnitude of a power for a next target load to be identified. In this case, the electronic device 101 may directly compare the previously obtained magnitude of the power with a power usage range which corresponds to the next target load. If whether to operate abnormally for all loads is identified, the electronic device 101 may again identify whether a target load to be identified which has the highest priority operates abnormally.

In an embodiment, the MCU 131 may fail to obtain the information related to the operation of the first load in operation 501. For example, the MCU 131 may receive information related to an operation of each of a plurality of loads (or loads having an update) at a designated period. The MCU 131 may request information related to an operation from the processor 120, and may receive the information related to the operation in response to the request. The electronic device 101 may not receive the information related to the operation within a designated period, or may not receive the information related to the operation even though the request is transmitted. For example, if the processor 120 operates abnormally, the MCU 131 may fail to receive the information related to the operation from the processor 120.

Figure 7:
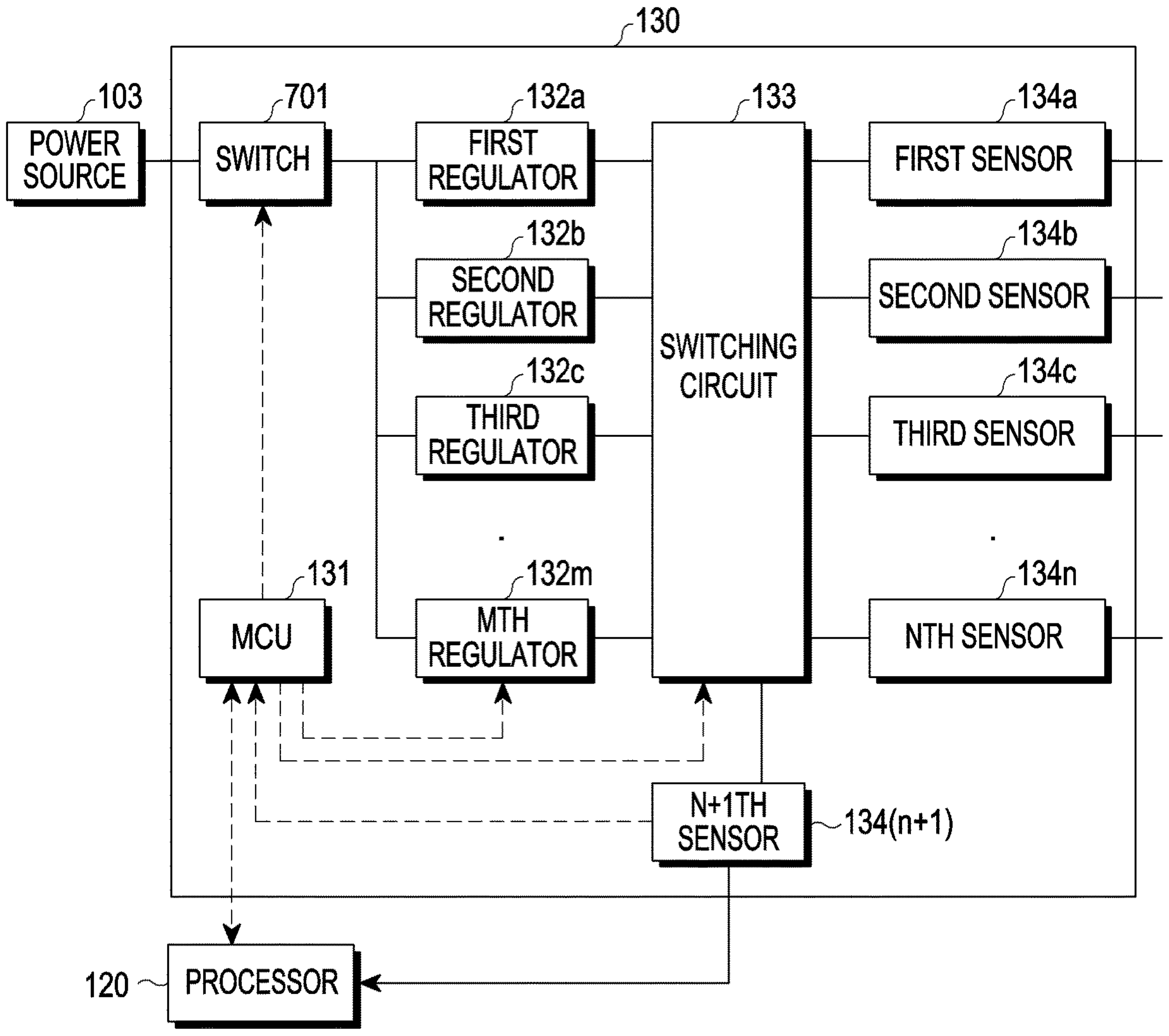
FIG. 7 is a block diagram illustrating example components in an electronic device according to an embodiment.

If the information related to the operation of each of the plurality of loads is not obtained, the electronic device 101, for example, may stop providing each of the plurality of loads with a power. The electronic device 101 may stop providing a power to all loads which currently operate, and in this case, the electronic device 101 may be automatically turned off. If the processor 120 operates abnormally, there is a probability that a reset operation of the electronic device 101 may not be performed, so the MCU 131 stops providing all loads with a power and thereby the electronic device 101 may be automatically turned off. As shown in FIG. 7, the power management circuit 130 may include a switch 701 for selectively connecting a power source 103 and a plurality of regulators 132*a*, 132*b*, 132*c*, and 132*m*. The MCU 131 may control the switch 701 to be in an off state based on the information related to the operation of the load being not obtained from the processor 120. As a power supply from the power source 103 is stopped, the electronic device 101 may be automatically turned off.

The electronic device 101 may stop a power supply to at least some (e.g., a load set to have a high probability of occurrence of a safety accident) among loads which currently operate. The electronic device 101 may provide the processor 120 with data indicating a stop of a power supply by the processor 120, thereby inducing an operation for diagnosing and/or resolving an error in the processor 120. In this case, the MCU 131 may stop a power supply to some loads by controlling at least one of a regulator which corresponds to some loads or a switch which corresponds to some loads.

Figure 6A:
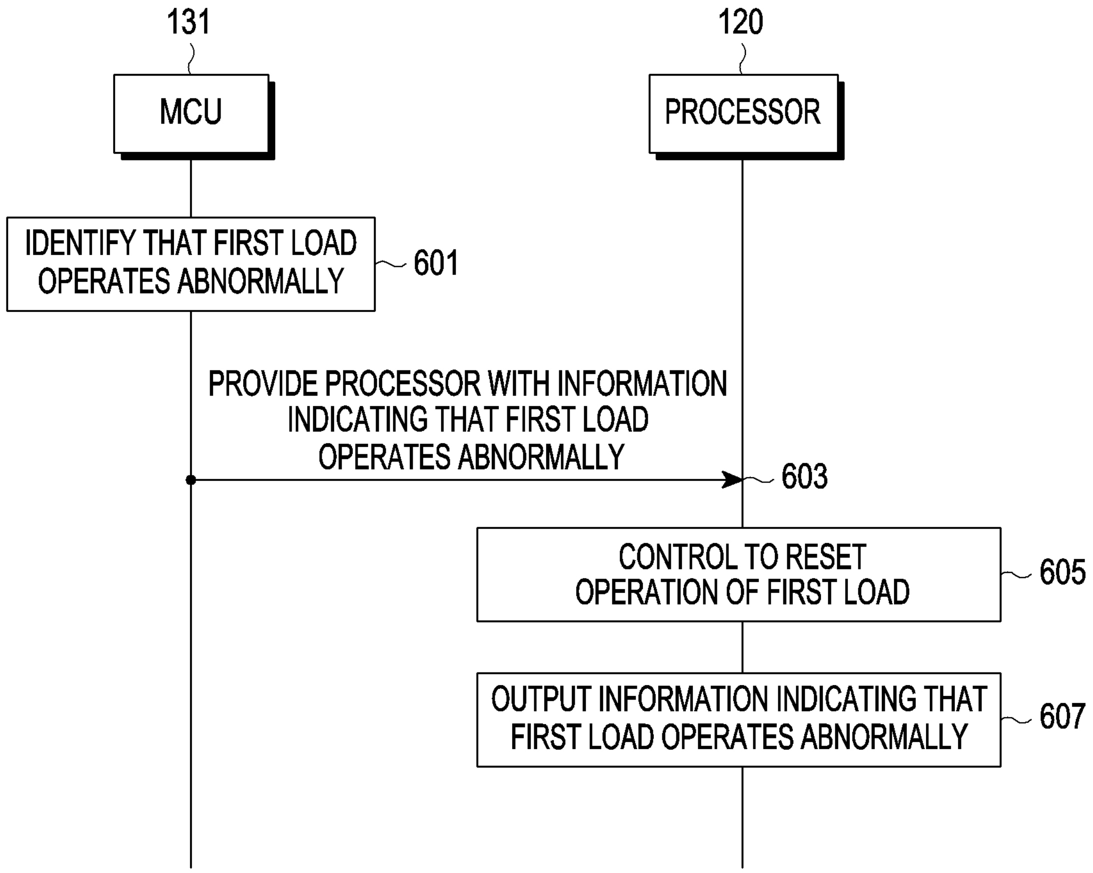
FIG. 6A is a signal flow diagram illustrating an example method of operating an electronic device according to an embodiment.

FIG. 6A is a signal flow diagram illustrating an example method of operating an electronic device according to an embodiment. Operations in FIGS. 6A and 6B are illustrated as being performed, for example, by a processor 120 which is outside a power management circuit 130 and an MCU 131 in FIG. 1A, however, these are merely examples and the operations may be performed alone by the MCU 131, or may be performed alone by the processor 120.

According to an embodiment, the MCU 131 may identify that a first load operates abnormally in operation 601. The MCU 131 may receive information related to an operation of the first load from, for example, the processor 120. The information related to the operation of the first load may include at least one of state information or control information of the first load. The MCU 131 may identify a power usage range which corresponds to the information related to the operation of the first load. The MCU 131 may receive a magnitude of a power input to the first load from a sensor. The MCU 131 may identify that the first load operates abnormally based on a comparison result between the magnitude of the power received from the sensor and the power usage range. As described above, the MCU 131 may identify that the first load operates abnormally based on whether a plurality of time-series sensed data satisfies a condition which is identified based on the information related to the operation of the first load.

According to an embodiment, the MCU 131 may provide the processor 120 with information indicating that the first load operates abnormally in operation 603. The processor 120 may perform control to reset an operation of the first load in operation 605. The processor 120 may control the first load to stop an operation currently being performed, or may transition a state of the first load into a defaulted state such as a sleep state or an idle state. In operation 607, the processor 120 may output information indicating that the first load operates abnormally. For example, the processor 120 may output a warning message on a display or output an alarm via a speaker.

Figure 6B:
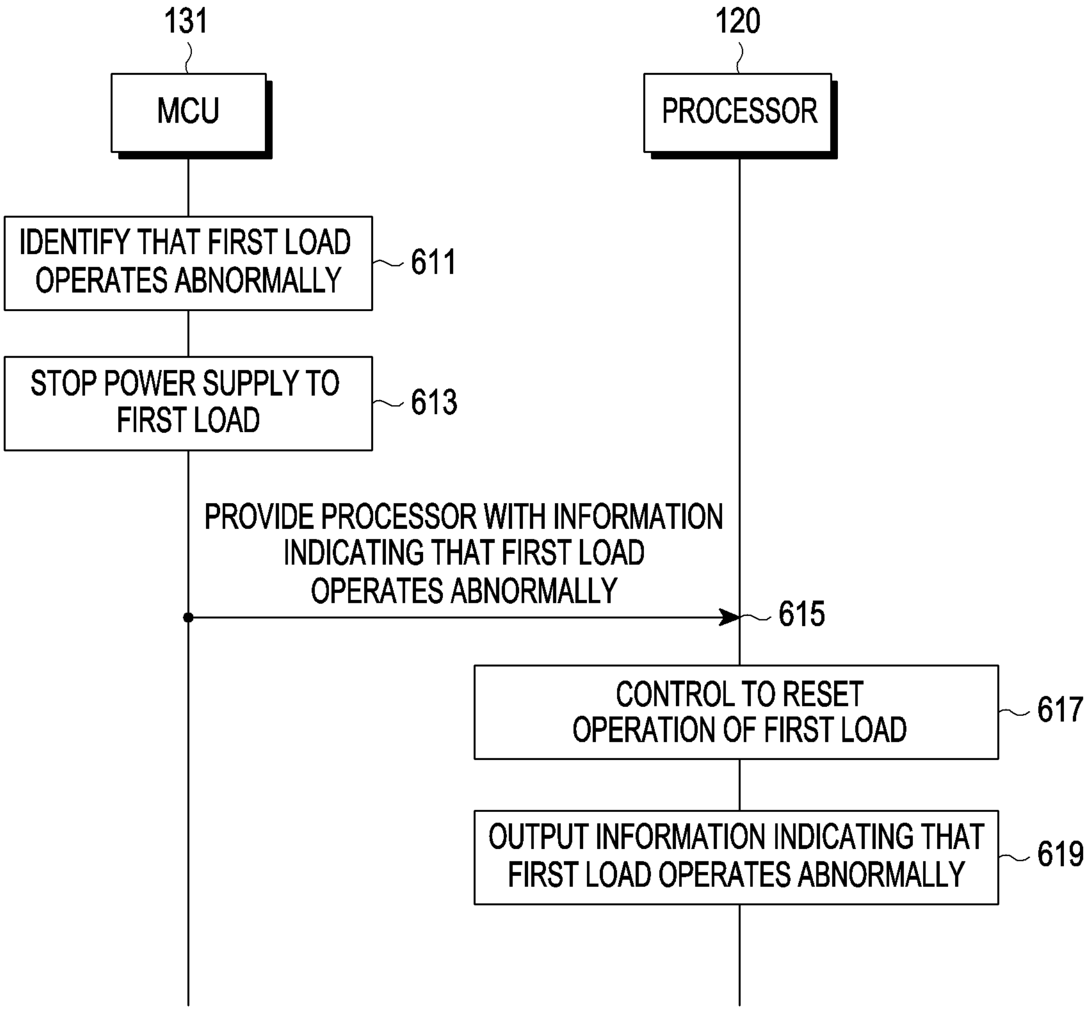
FIG. 6B is a signal flow diagram illustrating an example method of operating an electronic device according to an embodiment.

FIG. 6B is a signal flow diagram illustrating an example method of operating an electronic device according to an embodiment.

According to an embodiment, an MCU 131 may identify that a first load operates abnormally in operation 611. In operation 613, the MCU 131 may stop a power supply to the first load. The MCU 131 may stop the power supply to the first load by controlling a switch connecting the first load and a regulator to be in an off state. The MCU 131 may also control a regulator which corresponds to the first load to stop the power supply. In operation 615, the MCU 131 may provide a processor 120 with information indicating that the first load operates abnormally. In FIG. 6B, it has been described that the MCU 131 stops the power supply to the first load in operation 613, and provides the processor 120 with the information indicating that the first load operates abnormally in operation 615, however, this is merely an example for convenience of description, and there is no limitation to an order of two operations, and another operation may be further performed between the two operations. For example, the MCU 131 may proactively stop the power supply as in an order as illustrated in FIG. 6B, and provide the processor 120 with the information indicating that the first load operates abnormally. For another example, the MCU 131 may first provide the processor 120 with the information indicating that the first load operates abnormally, receive a request to stop a power supply from the processor 120, and stop the power supply to the first load based on the reception of the request to stop the power supply. For still another example, the MCU 131 may first provide the processor 120 with the information indicating that the first load operates abnormally, and if a response is not received from the processor 120, the MCU 131 may stop a power supply to the first load based on the response being not received.

According to an embodiment, the processor 120 may perform control to reset an operation of the first load in operation 617. The processor 120 may control the first load to stop an operation currently being performed, or may transition a state of the first load into a defaulted state such as a sleep state or an idle state, and/or the like. In operation 619, the processor 120 may output information indicating that the first load operates abnormally. The processor 120 may control the first load to resume the corresponding control operation after the first load is reset, or after the operation is stopped, or after the state is transitioned to the defaulted state. After resuming the corresponding control operation for the first load, the processor 120 may provide the MCU 131 with the control operation again. The MCU 131 may resume a power supply to the first load based on reception of the control operation. After resuming the power supply, the MCU 131 may receive a magnitude of a power input to the first load from a sensor and identify again whether the received magnitude of the power satisfies a designated condition. If it is again identified that the first load operates abnormally, the MCU 131 may repeat the above-described operations. The processor 120 may repeat the above-described operations and perform another designated operation if it is identified that an abnormal operation of the first load occurs more than a threshold number of times within a designated period. For example, the processor 120 may reset the electronic device 101. The processor 120 may execute an error diagnosis and/or error resolution instruction which corresponds to the first load.

FIG. 7 is a block diagram illustrating example components in an electronic device according to an embodiment. FIG. 7 is, for example, a diagram illustrating that a power management circuit 130 in FIG. 1A provides a processor 120 with a power.

Referring to FIG. 7, the power management circuit 130 may include a switch 701 for selectively connecting a power source 103 and a plurality of regulators 132*a*, 132*b*, 132*c*, and 132*m*. The MCU 131 may control the switch 701 to be in an off state based on information related to an operation of a load being not obtained from the processor 120. As a power supply from the power source 103 is stopped, the electronic device 101 may be automatically turned off.

The electronic device 101 may stop a power supply to at least some (e.g., a load set to have a high probability of occurrence of a safety accident) among loads which currently operate. The electronic device 101 may provide the processor 120 with data indicating a stop of a power supply by the processor 120, thereby inducing an operation for diagnosing and/or resolving an error in the processor 120. In this case, the MCU 131 may stop a power supply to some loads by controlling at least one of a regulator which corresponds to some loads or a switch which corresponds to some loads.

According to an embodiment, the power management circuit 130 may include an N+1th sensor 134($n$+1), and the N+1th sensor 134($n$+1) may sense a magnitude of a power input to the processor 120. The MCU 131 may receive the magnitude of the power input to the processor 120 from the N+1th sensor 134($n$+1). The MCU 131 may receive information related to an operation of the processor 120 from the processor 120, and identify a power usage range corresponding to the processor 120 based on the information. The MCU 131 may compare the identified power usage range with the magnitude of the power received from the N+1th sensor 134($n$+1), and identify whether the processor 120 operates abnormally based on a comparison result. If it is identified that the processor 120 operates abnormally, the electronic device 101 may report this to the processor 120 or control to stop a power supply to at least some of a plurality of loads 140*a*, 140*b*, 140*c*, and 140*n* as described above. The MCU 131 may control at least some of the switch 701, a switching circuit 133, and the plurality of regulators 132*a*, 132*b*, 132*c*, and 132*m* to stop a power supply to the processor 120.

Figure 8:
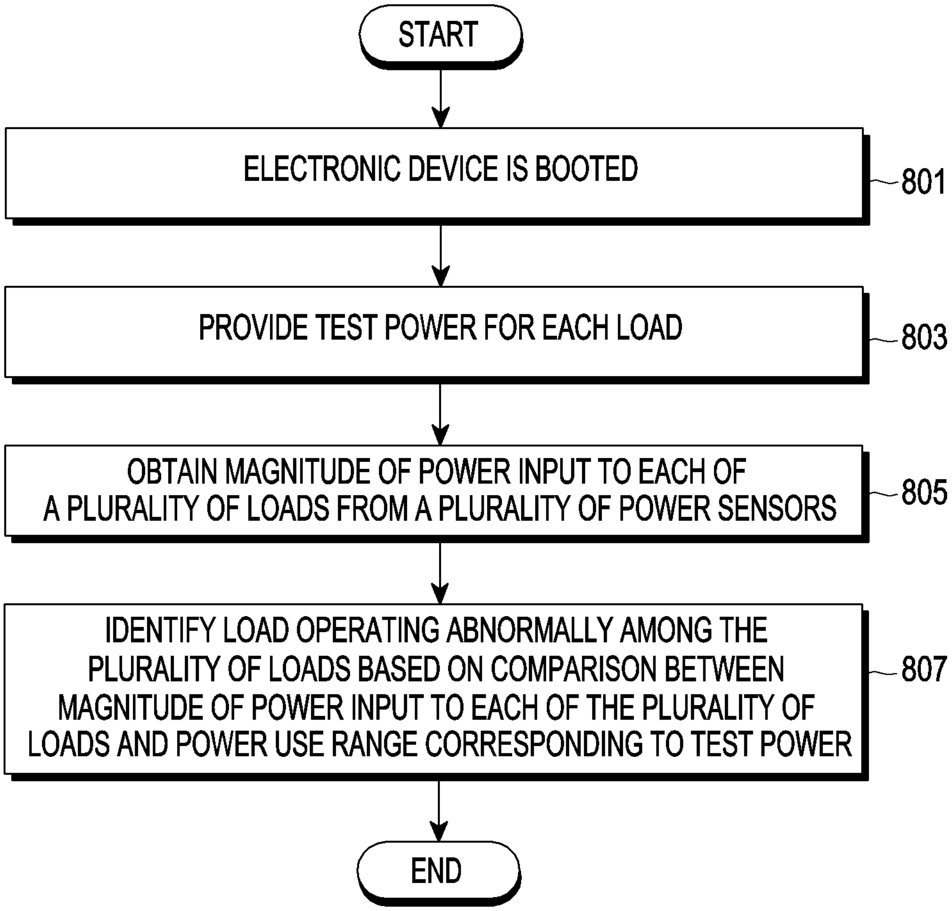
FIG. 8 is a flowchart illustrating an example method of operating an electronic device according to an embodiment.

FIG. 8 is a flowchart illustrating an example method of operating an electronic device according to an embodiment. Operations in FIG. 8 may be performed, for example, by a processor 120 alone, which is outside a power management circuit 130 in FIG. 1A, or an MCU 131 alone, which is within the power management circuit 130, or may be performed by the processor 120 outside the power management circuit 130 and the MCU 131 within the power management circuit 130.

According to an embodiment, in operation 801, an electronic device 101 (e.g., at least one of a processor 120 or an MCU 131) may perform a booting operation of the electronic device 101. In operation 803, the electronic device 101 may provide a test power for each load. In operation 805, the electronic device 101 may obtain a magnitude of a power input to each of a plurality of loads 140*a*, 140*b*, 140*c*, and 140*n* from a plurality of power sensors 134*a*, 134*b*, 134*c*, and 134*n*. In operation 807, the electronic device 101 may identify a load which operates abnormally among the plurality of loads 140*a*, 140*b*, 140*c*, and 140*n* based on a result of a comparison between the magnitude of the power input to each of the plurality of loads 140*a*, 140*b*, 140*c*, and 140*n* and a power use range corresponding to the test power. For example, the electronic device 101 may set state information of a first load (e.g., a mobile motor) to a sleep state, and the first load may be in the sleep state. The electronic device 101 may compare a power usage range corresponding to the sleep state of the first load with a magnitude of a power input to the first load, and identify whether the first load operates abnormally based on a comparison result. Thereafter, the electronic device 101 may change the state of the first load to another state. The electronic device 101 may compare a power usage range corresponding to the changed state of the first load with the magnitude of the power input to the first load, and identify whether the first load operates abnormally in the changed state based on a result of the comparison. The electronic device 101 may compare a power usage range corresponding to each piece of control information with the magnitude of the power input to the first load while changing control information, and identify whether the first load operates abnormally in the changed state based on a result of the comparison. Based on the above-described process, the electronic device 101 may identify whether the first load operates normally. The electronic device 101 may also identify whether another load operates normally while changing state information and/or control information for the other load. If it is identified that an arbitrary load operates abnormally, the electronic device 101 may perform error analysis. The electronic device 101 may output information about an occurrence of an error. Thereafter, if an operation command for a corresponding load is identified, the electronic device 101 may control the corresponding load to perform a corresponding operation after an error resolution for the corresponding load is identified.

In an embodiment of FIG. 8, the electronic device 101 is illustrated as performing the above-described test at booting, however this is merely an example. In another embodiment, the electronic device 101 may perform the above-described test if an automatic error detection event is identified even after booting.

Figure 9:
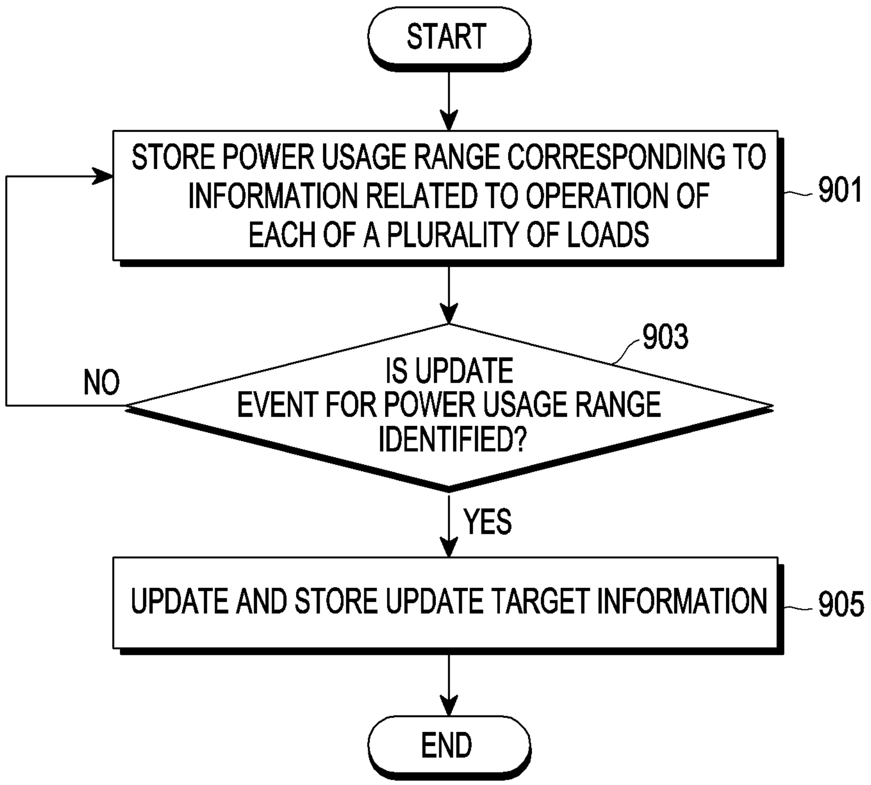
FIG. 9 is a flowchart illustrating an example method of operating an electronic device according to an embodiment.

FIG. 9 is a flowchart illustrating an example method of operating an electronic device according to an embodiment. Operations in FIG. 9 may be performed, for example, by a processor 120 alone, which is outside a power management circuit 130 in FIG. 1A, or an MCU 131 alone, which is within the power management circuit 130, or may be performed by the processor 120 outside the power management circuit 130 and the MCU 131 within the power management circuit 130.

According to an embodiment, an electronic device 101 (e.g., at least one of the processor 120 or the MCU 131) may store a power usage range corresponding to information related to an operation of each of a plurality of loads 140*a*, 140*b*, 140*c*, and 140*n* in operation 901. The power usage range corresponding to the information related to the operation may be stored in a memory accessible by the processor 120 or the MCU 131 when the electronic device 101 is manufactured. The memory may be included in a power management circuit 130 or may be implemented with hardware separate from the power management circuit 130. The electronic device 101 may measure a magnitude of a power input to each load during a normal operation, in response to state information and/or control information for each load. The electronic device 101 may generate and store a power usage range which corresponds to the information related to the operation for each load based on a measurement result.

According to an embodiment, in operation 903, the electronic device 101 may identify an update event for a power usage range. If the update event is identified (903—yes), the electronic device 101 may update and store update target information in operation 905.

For example, the electronic device 101 may define new state information and/or control information, and may define a power use range corresponding to the newly defined information. For example, if the electronic device 101 moves in an accelerated manner on a slope, more power may be consumed than an acceleration movement on a plane. Even though the electronic device 101 may set a power usage range which corresponds to control information indicating an acceleration movement for a mobile motor to 50 W to 80 W, a power consumed by the mobile motor on a slope may be 100 W. There is a probability that the electronic device 101 stops a power supply to the mobile motor based on a magnitude of a sensed power being out of a power usage range. The electronic device 101 may define control information indicating an acceleration movement on a slope and maintain power supply to the mobile motor. For example, the electronic device 101 may identify that acceleration on the slope is required based on sensed information (e.g., an image and/or altitude information) of a surrounding environment, and define and store control information and a corresponding power usage range corresponding to the identification.

For example, the electronic device 101 may receive information about an updated power usage range from an external server. The external server may receive information about a power magnitude for each load which operates normally and/or a power magnitude for each load which operates abnormally, from a plurality of electronic devices including the electronic device 101. The external server may identify a power usage range corresponding to more accurate information related to an operation of a load, based on received big data. For example, the external server may cluster big data to identify a cluster corresponding to a normal operation and a cluster corresponding to an abnormal operation. The external server may transmit information about the cluster corresponding to the normal operation and the cluster corresponding to the abnormal operation to the electronic device 101. The electronic device 101 may store the information about the cluster corresponding to the normal operation and the cluster corresponding to the abnormal operation as update information. The electronic device 101 may identify whether an arbitrary load operates abnormally based on a magnitude of a power input to the arbitrary load and the stored information about the cluster corresponding to the normal operation and the cluster corresponding to the abnormal operation. The above-described clustering method is a merely an example, and there is no limitation to a processing algorithm for generating a model for identifying whether a load operates normally or abnormally by processing big data. The electronic device 101 may also receive a model generated based on various schemes, and then apply, to the model, a sensed magnitude of a power input to an arbitrary load. The electronic device 101 may identify whether arbitrary load operates abnormally based on a result of application to the model.

As is apparent from the foregoing description, according to an example embodiment, an electronic device and an operating method thereof may be provided that may identify whether a load operates abnormally based on a comparison between a power actually consumed by the load and a consumed power to be expected. Accordingly, even if a processor (for example, an AP) malfunctions or it is impossible to control a load, a power supply to the load may be stopped and thereby a possibility of an accident may be reduced.

An electronic device according to an example embodiment of the present disclosure may be one of various types of electronic devices. The electronic device may include, for example, and without limitation, a portable communication device (e.g., a smart phone), a computer device, a portable multimedia device, a portable medical device, a camera, a wearable device, a home appliance, or the like. According to an embodiment of the present disclosure, the electronic device is not limited to those described above.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., wiredly), wirelessly, or via a third component.

As used herein, the term "module" may include a unit implemented in hardware, software, or firmware, or any combination thereof, and may interchangeably be used with other terms, for example, "logic," "logic block," "part," or "circuitry", and/or the like. A module may be a single integral component, or a minimum unit or part thereof, adapted to perform one or more functions. For example, according to an embodiment, a module may be implemented in the form of an application-specific integrated circuit (ASIC).

An embodiment as set forth herein may be implemented as software (e.g., a program) including one or more instructions that are stored in a storage medium (e.g., an internal memory or an external memory) that is readable by a machine (e.g., a master device or a device performing tasks). For example, a processor of the machine (e.g., the master device or the device performing the tasks) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the "non-transitory" storage medium is a tangible device, and may not include a signal (e.g., an electromagnetic wave), but this term does not differentiate between a case that data is semi-permanently stored in the storage medium and a case that the data is temporarily stored in the storage medium.

According to an embodiment, a method according to embodiments of the present disclosure may be included and provided in a computer program product. The computer program product may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or a plurality of entities. According to an embodiment, one or more of the above-described components may be omitted, or one or more other components may be added. Alternatively or additionally, a plurality of components (e.g., a module or a program) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will the understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device, comprising:

a plurality of loads;

a processor; and a power management circuit configured to provide the plurality of loads with power, wherein the power management circuit comprises:

a plurality of regulators configured to adjust a voltage of a power received from a power source and output a voltage-adjusted power;

a switching circuit configured to connect at least one of the plurality of regulators to at least one of the plurality of loads;

a plurality of power sensors, each of the plurality of power sensors being configured to measure a magnitude of a power input to each of the plurality of loads; and a controller, wherein the controller is configured to:

receive information related to an operation of the electronic device from the processor;

identify a power usage range of each of the plurality of loads based at least on the information related to the operation of the electronic device, and/or identify a power usage range of each of the plurality of loads included in the information related to the operation of the electronic device;

receive the measured magnitude of the power input to each of the plurality of loads from each of the plurality of power sensors;

compare the power usage range of each of the plurality of loads with the measured magnitude of the power input to each of the plurality of loads; and identify a load which operates abnormally among the plurality of loads based on a result of the comparison.

2. The electronic device of claim 1, wherein, as at least part of the operation of identifying the load which operates abnormally among the plurality of loads, the controller is configured to:

based on a magnitude of a power input to a first load among the plurality of loads being included in a first power usage range identified by information related to an operation of the first load, identify that the first load operates normally; and based on the magnitude of the power input to the first load being not included in the first power usage range, identify that the first load operates abnormally.

3. The electronic device of claim 1, wherein, as at least part of the operation of identifying the load which operates abnormally among the plurality of loads, the controller is configured to:

identify a number of magnitudes of powers included in a first power usage range identified by information related to an operation of a first load among a plurality of time series magnitudes of powers input to the first load among the plurality of loads;

based on a ratio of the magnitudes of the powers included in the first power usage range to a number of the plurality of time series magnitudes of the powers being greater than or equal to a threshold ratio, identify that the first load operates normally; and based on the ratio of the magnitudes of the powers included in the first power usage range to the number of the plurality of time series magnitudes of the powers being less than the threshold ratio, identify that the first load operates abnormally.

4. The electronic device of claim 1, wherein the controller is configured to control a regulator corresponding to the load which operates abnormally among the plurality of loads to stop a power supply to the load which operates abnormally.

5. The electronic device of claim 1, wherein the controller is configured to control a switch corresponding to the load which operates abnormally among the plurality of loads to be in an off state.

6. The electronic device of claim 1, wherein the controller is configured to provide the processor with information about the load which operates abnormally among the plurality of loads, and wherein the processor is configured to perform at least one of an operation of resetting the load which operates abnormally, an operation of stopping an operation of the load which operates abnormally, or an operation of outputting the information about the load which operates abnormally.

7. The electronic device of claim 1, wherein the information related to the operation of the electronic device includes at least one of state information of each of the plurality of loads, or control information of each of the plurality of loads.

8. The electronic device of claim 1, wherein, as at least part of the operation of identifying the load which operates abnormally among the plurality of loads, the controller is configured to identify whether each of the plurality of loads operates abnormally in a priority order.

9. The electronic device of claim 1, wherein the controller is configured to stop a power supply to the processor based on identification of an abnormal operation of the processor.

10. The electronic device of claim 9, further comprising:

a switch configured to selectively connect the power source and the plurality of regulators, wherein, as at least part of the operation of stopping the power supply to the processor, the controller is configured to control the switch, at least some of the plurality of regulators, or at least some of the switching circuit.

11. The electronic device of claim 9, wherein the controller is configured to identify the abnormal operation of the processor based on at least one of the information related to the operation of the electronic device not being obtained from the processor, or a response to a request to the processor not being received.

12. The electronic device of claim 9, wherein the controller is configured to:

receive a magnitude of a power input to the processor from a first power sensor among the plurality of power sensors configured to sense the magnitude of the power input to the processor; and based on a comparison between information related to an operation of the processor and the magnitude of the power input to the processor, identify the abnormal operation of the processor.

13. The electronic device of claim 1, wherein the controller is configured to update a pre-stored power usage range corresponding to the information related to the operation of the electronic device.

14. The electronic device of claim 1, wherein, as at least part of the operation of identifying the load which operates abnormally among the plurality of loads, the controller is configured to:

based on a magnitude of a power input to a first load among the plurality of loads satisfying a second condition related to a first value corresponding to information related to an operation of the first load among the plurality of loads, identify that the first load operations normally; and based on the magnitude of the power input to the first load not satisfying the second condition, identify that the first load operations abnormally.

15. The electronic device of claim 14, wherein, as at least part of the operation of identifying the load which operates abnormally among the plurality of loads, the controller is configured to identify whether a plurality of time series magnitudes of powers input to the first load satisfy the second condition.

16. A method of operating an electronic device including a plurality of loads and a power management circuit configured to provide the plurality of loads with a power, comprising:

obtaining information related to an operation of the electronic device;

identifying a power usage range of each of the plurality of loads based at least on the information related to the operation of the electronic device, and/or identifying a power usage range of each of the plurality of loads included in the information related to the operation of the electronic device;

receiving a magnitude of a power input to each of the plurality of loads from each of a plurality of power sensors;

comparing the power usage range of each of the plurality of loads with the magnitude of the power input to each of the plurality of loads; and identifying a load which operates abnormally among the plurality of loads based on a result of the comparison.

17. A power management circuit configured to provide a plurality of loads with a power, comprising:

a plurality of regulators configured to adjust a voltage of a power received from a power source and output a voltage-adjusted power;

a switching circuit configured to connect at least one of the plurality of regulators to at least one of the plurality of loads;

a plurality of power sensors, each of the plurality of power sensors being configured to measure a magnitude of a power input to each of the plurality of loads; and a controller, wherein the controller is configured to:

receive information related to an operation of an electronic device comprising the plurality of loads from an external electronic device;

identify a power usage range of each of the plurality of loads based on the information related to the operation of the electronic device, and/or identify a power usage range of each of the plurality of loads included in the information related to the operation of the electronic device;

receive the measured magnitude of the power input to each of the plurality of loads from each of the plurality of power sensors;

compare the power usage range of each of the plurality of loads with the measured magnitude of the power input to each of the plurality of loads; and identify a load which operates abnormally among the plurality of loads based on a result of the comparison.

18. An electronic device, comprising:

a plurality of loads;

a processor; and a power management circuit configured to provide the plurality of loads with a power, wherein the power management circuit comprises:

a plurality of regulators configured to adjust a voltage of a power received from a power source and output a voltage-adjusted power;

a switching circuit configured to connect at least one of the plurality of regulators to at least one of the plurality of loads; and a plurality of power sensors, each of the plurality of power sensors being configured to measure a magnitude of a power input to each of the plurality of loads, wherein the processor is configured to:

obtain information related to an operation of the electronic device;

identify a power usage range of each of the plurality of loads based at least on the information related to the operation of the electronic device, or identify a power usage range of each of the plurality of loads included in the information related to the operation of the electronic device;

receive the measured magnitude of the power input to each of the plurality of loads from each of the plurality of power sensors;

compare the power usage range of each of the plurality of loads with the measured magnitude of the power input to each of the plurality of loads; and identify a load which operates abnormally among the plurality of loads based on a result of the comparison.

* * * * *